(12) United States Patent
Wang et al.

(10) Patent No.: US 9,641,340 B2
(45) Date of Patent: May 2, 2017

(54) CERTIFICATELESS MULTI-PROXY SIGNATURE METHOD AND APPARATUS

(71) Applicant: Huawei Device Co., Ltd., Shenzhen (CN)

(72) Inventors: Chan Wang, Shenzhen (CN); Huangwei Wu, Shenzhen (CN)

(73) Assignee: Huawei Device Co., Ltd., Shenzhen, Guangdong ( * ) Notice: Subject to any disclaimer, the term of this patent is extended or adjusted under 35 U.S.C. 154(b) by 132 days.

(21) Appl. No.: 14/830,978

(22) Filed: Aug. 20, 2015

(65) Prior Publication Data

US 2015/0358167 A1 Dec. 10, 2015

Related U.S. Application Data

(63) Continuation of application No. PCT/CN2014/085599, filed on Aug. 29, 2014.

(30) Foreign Application Priority Data

Sep. 16, 2013 (CN) .......................... 2013 1 0422950

(51) Int. Cl.
*H04L 9/32* (2006.01)
*H04L 29/06* (2006.01)
*H04L 9/30* (2006.01)

(52) U.S. Cl.
CPC .......... *H04L 9/3247* (2013.01); *H04L 9/3066* (2013.01); *H04L 63/0281* (2013.01);
(Continued)

(58) Field of Classification Search
USPC ....................................................... 713/170
See application file for complete search history.

(56) References Cited

U.S. PATENT DOCUMENTS

| 2005/0005126 A1* | 1/2005 | Zhang | H04L 9/083 713/176 |
| 2009/0327735 A1* | 12/2009 | Feng | H04L 9/0891 713/180 |
| 2013/0138962 A1* | 5/2013 | Kamijoh | H04L 9/30 713/175 |

FOREIGN PATENT DOCUMENTS

| CN | 101051901 A | 10/2007 |
| CN | 101378316 A | 3/2009 |

(Continued)

OTHER PUBLICATIONS

Partial English Translation and Abstract of Chinese Patent Application No. CN102387019, Nov. 28, 2015, 12 pages.
(Continued)

*Primary Examiner* — Jeffrey Pwu
*Assistant Examiner* — Samuel Ambaye
(74) *Attorney, Agent, or Firm* — Conley Rose, P.C.

(57) ABSTRACT

A certificateless multi-proxy signature method and apparatus, where the method may include computing, by a proxy signature device, a public key and a private key of the proxy signature device according to a public parameter, where the public key is corresponding to the private key, acquiring a verification result of a standard signature and determining, according to the verification result, whether the standard signature is valid, computing a partial proxy signature of the proxy signature device according to the private key if the verification result is used to represent that the standard signature is valid, and sending the partial proxy signature to a proxy signature device administrator, so that after the proxy signature device administrator obtains a multi-proxy signature through computation according to the partial proxy signature, a multi-proxy signature verification device verifies the multi-proxy signature.

14 Claims, 7 Drawing Sheets

(52) U.S. Cl.
CPC ........ *H04L 63/0457* (2013.01); *H04L 63/126* (2013.01); *H04L 2209/76* (2013.01)

(56) References Cited

FOREIGN PATENT DOCUMENTS

| | | |
|---|---|---|
| CN | 102387019 A | 3/2012 |
| CN | 103259662 A | 8/2013 |

OTHER PUBLICATIONS

Foreign Communication From a Counterpart Application, PCT Application No. PCT/CN2014/085599, English Translation of International Search Report dated Dec. 3, 2014, 2 pages.
Foreign Communication From a Counterpart Application, PCT Application No. PCT/CN2014/085599, Written Opinion dated Dec. 3, 2014, 4 pages.
Jin, Z., et al., "Certificateless multi-proxy signature," Elsevier, Computer Communications, vol. 34, No. 3, Mar. 2011, pp. 344-352.
Castro, R., et al., "Efficient Certiticateless Signatures Suitable for Aggregation," International Association for Cryptologic Research, vol. 20071207:145809, Dec. 6, 2007, 24 pages.
Tian, M., et al., "Cryptanalysis and improvement of a certificateless multi-proxy signature scheme," International Association for Cryptologic Research, vol. 20110713:010607, Jul. 13, 2011, 11 pages.
Foreign Communication From a Counterpart Application, European Application No. 14844666.9, Extended European Search Report dated Mar. 22, 2016, 5 pages.

\* cited by examiner

CERTIFICATELESS MULTI-PROXY SIGNATURE METHOD AND APPARATUS

CROSS-REFERENCE TO RELATED APPLICATIONS

This application is a continuation of international application No. PCT/CN2014/085599, filed on Aug. 29, 2014, which claims priority to Chinese Patent Application No. 201310422950.9, filed on Sep. 16, 2013, both of which are hereby incorporated by reference in their entireties.

TECHNICAL FIELD

The present disclosure relates to the field of information security, and in particular, to a certificateless multi-proxy signature method and apparatus.

BACKGROUND

A public key cryptography system can be classified into three types: 1. a certificate-based public key cryptography system; 2. an identity-based public key cryptography system; 3. a certificateless public key cryptography system. The certificate-based public key cryptography system has a certificate management problem, and needs to consume many storage, computing, and communication resources. The identity-based public key cryptography system has an inherent key disclosure problem. The certificateless public key cryptography system resolves the foregoing two problems. A certificateless multi-proxy signature scheme is operated largely based on bilinear pairings.

Generally, certificateless multi-proxy signature (that is, multi-proxy signature based on the certificateless public key cryptography system) may be used. The certificateless multi-proxy signature does not need a certificate server to save a user's certificate, and avoids the key disclosure problem that is inherent in the identity-based public key cryptography system.

In the case of the multi-proxy signature, an original signature device is allowed to grant a signature capability of the original signature device to multiple proxy signature devices, and a valid proxy signature can be generated only when all the proxy signature devices cooperate with each other, where the proxy signature is used to represent the original signature device.

In a process of implementing the foregoing certificateless multi-proxy signature, the inventor finds that the has at least the following problem: the certificateless multi-proxy signature scheme is operated based on bilinear pairings, and the bilinear pairings involve a large computing amount and consume longer time in implementing a signature operation compared with other mechanisms. Generally, a computation cost of bilinear pairings is approximately more than 20 times that of scalar multiplication over elliptic curve group.

SUMMARY

Embodiments of the present disclosure provide a certificateless multi-proxy signature method and apparatus, which decreases a computing amount, thereby reducing computing time.

To achieve the foregoing objective, the following technical solutions are adopted in the embodiments of the present disclosure According to a first aspect, a certificateless multi-proxy signature method is provided, including computing, by a proxy signature device, a public key and a private key of the proxy signature device according to a public parameter, where the public key is corresponding to the private key, acquiring a verification result of a standard signature, and determining, according to the verification result, whether the standard signature is valid, where the standard signature includes T and V, where T is obtained through computation by a standard signature computing device according to a formula $T=rP$, and V is obtained through computation by the standard signature computing device according to a formula $V=D_a+x_aH_1(m,T,P_a)+rH_2(m,T,P_a)$, computing a partial proxy signature of the proxy signature device according to the private key if the verification result is used to represent that the standard signature is valid, and sending the partial proxy signature to a proxy signature device administrator, so that after the proxy signature device administrator obtains a multi-proxy signature through computation according to the partial proxy signature, a multi-proxy signature verification device verifies the multi-proxy signature, where r is randomly selected from $Z^*_q$ according to a formula $r \in Z^*_q$; a is a sequence number of the standard signature computing device and $0 \le a \le l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\cdot)$, $H_2(\cdot)$ and P, where P is a generator of G, and G is a group G whose order is a prime number q.

In a first possible implementation manner of the first aspect, the standard signature computing device is any one of the proxy signature device, an original signature device, and another signature device except the original signature device and the proxy signature device, the verification result is obtained after a standard signature verification device verifies the standard signature according to a formula $VP=P_{pub}H(ID_a,P_a)+P_aH_1(m,T,P_a)+TH_2(m,T,P_a)$, where the standard signature verification device is any one of the proxy signature device, the original signature device, and the another signature device except the original signature device and the proxy signature device, and the standard signature verification device is different from the standard signature computing device; where $ID_a$ is an identifier of the standard signature computing device, and the public parameter further includes $P_{pub}$.

With reference to the first aspect or the first possible implementation manner of the first aspect, in a second possible implementation manner of the first aspect, the computing, by a proxy signature device, a public key and a private key of the proxy signature device according to a public parameter includes randomly selecting $x_i$ from $Z^*_q$ according to a formula $x_i \in Z^*_q$, computing the public key according to a formula $P_i=x_iP$, and computing a second sub-private key according to a formula $D_i=sH(ID_i,P_i)$; where i ($1 \le i \le n$) is a sequence number of the proxy signature device, where n is a quantity of proxy signature devices; $x_i$ is a first sub-private key included in the private key of the proxy signature device; $D_i$ is the second sub-private key included in the private key of the proxy signature device; $P_i$ is the public key of the proxy signature device; $ID_i$ is an identifier of the proxy signature device; s is a master key; and the public parameter includes $H(\cdot)$ and q.

With reference to the second possible implementation manner of the first aspect, in a third possible implementation manner, the computing a partial proxy signature according to the private key includes acquiring an authorization signature computed by the original signature device, where the authorization signature includes $\omega$, $T_0$, and $V_0$, verifying the authorization signature according to a formula $V_0P=P_{pub}H(ID_0,P_0)+P_0H_1(\omega,T_0,P_0)+T_0H_2(\omega,T_0,P_0)$, randomly selecting $r_i$ from $Z^*_q$ according to a formula $r_i\epsilon Z^*_q$ if it is verified that the authorization signature is valid, computing $T_i$ according to a formula $T_i=r_iP$, and computing $V_i$ according to a formula $V_i=D_i+x_iH_3(m,T_i,P_i)+r_iH_4(m,T_i,P_i)$, where the partial proxy signature includes $\omega$, $T_0$, $V_0$, $T_i$, and $V_i$; where $\omega$ includes identity information of the proxy signature device and identity information of the original signature device; $T_0$ is obtained through computation by the original signature device according to a formula $T_0=r_0P$, where $r_0$ is randomly selected by the original signature device from $Z^*_q$ according to a formula $r_0\epsilon Z^*_q$; $V_0$ is obtained through computation by the original signature device according to a formula $V_0=D_0+x_0H_1(\omega,T_0,P_0)+r_0H_2(\omega,T_0,P_0)$; $x_0(\epsilon Z^*_q)$ is a first sub-private key of the original signature device; $D_0(=sH(ID_0,P_0))$ is a second sub-private key of the original signature device; $ID_0$ is an identifier of the original signature device; is $P_0(=x_0P)$ is a public key of the original signature device; m is a message m input by an input end; and the public parameter further includes $H_3(\bullet)$, $H_4(\bullet)$, and $P_{pub}$.

According to a second aspect, a certificateless multi-proxy signature method is provided, including acquiring, by a multi-proxy signature verification device, a multi-proxy signature after a standard signature verification device verifies that a standard signature is valid, where the standard signature includes T and V, where T is obtained through computation by a standard signature computing device according to a formula $T=rP$, and V is obtained through computation by the standard signature computing device according to a formula $V=D_a+x_aH_1(m,T,P_a)+rH_2(m,T,P_a)$; the multi-proxy signature is obtained through computation by a proxy signature device administrator according to a partial proxy signature of each proxy signature device; and the partial proxy signature is obtained through computation by the proxy signature device according to a private key of the proxy signature device, and verifying the multi-proxy signature according to a public key of each proxy signature device; where r is randomly selected from $Z^*_q$ according to a formula $r\epsilon Z^*_q$; a is a sequence number of the standard signature computing device and $0\leq a\leq l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\bullet)$, $H_2(\bullet)$, and P, where P is a generator of G, and G is a group G whose order is a prime number q.

In a first possible implementation manner of the second aspect, $P_a$ is obtained through computation by the standard signature computing device according to a formula $P_a=x_aP$, where $x_a$ is randomly selected by the standard signature computing device from $Z^*_q$ according to a formula $x_a\epsilon Z^*_q$, and $D_a$ is obtained through computation by the standard signature computing device according to a formula $D_a=sH(ID_a,P_a)$; where $ID_a$ is an identifier of the standard signature computing device, S is a master key, and the public parameter includes $H(\bullet)$ and q.

With reference to the first possible implementation manner of the second aspect, in a second possible implementation manner of the second aspect, the standard signature verification device verifies the standard signature according to a formula $VP=P_{pub}H(ID_a,P_a)+P_aH_1(m,T,P_a)+TH_2(m,T,P_a)$; the standard signature computing device is either of another signature device except an original signature device and the proxy signature device, and the original signature device; the standard signature verification device is any one of the proxy signature device, the original signature device, and the another signature device except the original signature device and the proxy signature device; and the standard signature verification device is different from the standard signature computing device; where the public parameter further includes $P_{pub}$.

With reference to the second possible implementation manner of the second aspect, in a third possible implementation manner of the second aspect, the acquiring a multi-proxy signature includes determining whether the proxy signature device administrator verifies, according to the partial proxy signature of each proxy signature device, that both of a formula $V_0P=P_{pub}H(ID_0,P_0)+P_0H_1(\omega,T_0,P_0)+T_0H_2(\omega,T_0,P_0)$ and a formula $V_iP=P_{pub}H(ID_i,P_i)+P_iH_3(m,T_i,P_i)+T_iH_4(m,T_i,P_i)$ hold, and if yes, computing the multi-proxy signature according to a formula $\sigma=(\omega,T_{MP},V_{MP})$; where $V_0$ is obtained through computation by the original signature device according to formula $V_0=D_0+x_0H_1(\omega,T_0,P_0)+r_0H_2(\omega,T_0,P_0)$, $\omega$ includes identity information of the proxy signature device and identity information of the original signature device, $T_0$ is obtained through computation by the original signature device according to formula $T_0=r_0P$, and $r_0$ is randomly selected by the original signature device from $Z^*_q$ according to formula $r_0\epsilon Z^*_q$; $\sigma$ is the multi-proxy signature; $T_{MP}=(T_0, T_1, \ldots, T_n)$, where $T_i$ is obtained through computation by a proxy signature device with a sequence number of i according to a formula $T_i=r_iP$, where $r_i$ is randomly selected by the proxy signature device with the sequence number of i from $Z^*_q$ according to a formula $r_i\epsilon Z^*_q$; $V_{MP}=\Sigma_{i=0}^{n}V_i$, where $V_i$ is obtained through computation by the proxy signature device with the sequence number of i according to a formula $V_i=D_i+x_iH_3(m,T_i,P_i)+r_iH_4(m,T_i,P_i)$, i ($1\leq i\leq n$) is a sequence number of the proxy signature device, and n is a quantity of proxy signature devices; and the public parameter further includes $H_3(\bullet)$ and $H_4(\bullet)$.

With reference to the third possible implementation manner of the second aspect, in a fourth possible implementation manner of the second aspect, the performing the multi-proxy signature according to a public key of each proxy signature device includes verifying the multi-proxy signature according to a formula $V_{MP}P=P_{pub}\Sigma_{i=0}^{n}H(ID_i,P_i)+\Sigma_{i=1}^{n}P_iH_3(m,T_i,P_i)+\Sigma_{i=1}^{n}T_iH_4(m,T_i,P_i)+P_0H_1(\omega,T_0,P_0)+T_0H_2(\omega,T_0,P_0)$.

According to a third aspect, a certificateless multi-proxy signature apparatus is provided, including a first computing unit configured to compute a public key and a private key of a proxy signature device according to a public parameter, where the public key is corresponding to the private key, an acquiring unit configured to configured to acquire a verification result of a standard signature, and determine, according to the verification result, whether the standard signature is valid, where the standard signature includes T and V, where T is obtained through computation by a standard signature computing device according to a formula $T=rP$, and V is obtained through computation by the standard signature computing device according to a formula $V=D_a+x_aH_1(m,T,P_a)+rH_2(m,T,P_a)$, a second computing unit configured to compute a partial proxy signature of the proxy signature device according to the private key if the verification result is used to represent that the standard signature is valid, and a sending unit configured to send the partial proxy signature to a proxy signature device administrator, so that after the proxy signature device administrator obtains a multi-proxy signature through computation according to the partial proxy signature, a multi-proxy signature verification device verifies the multi-proxy signature, where r is randomly selected from $Z^*_q$ according to a formula $r \in Z^*_q$; a is a sequence number of the standard signature computing device and $0 \leq a \leq l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\cdot)$, $H_2(\cdot)$, and P, where P is a generator of G, and G is a group G whose order is a prime number q.

In a first possible implementation manner of the third aspect, the standard signature computing device is any one of the proxy signature device, an original signature device, and another signature device except the original signature device and the proxy signature device, the verification result is obtained after a standard signature verification device verifies the standard signature according to a formula $VP = P_{pub}H(ID_a,P_a) + P_aH_1(m,T,P_a) + TH_2(m,T,P_a)$, where the standard signature verification device is any one of the proxy signature device, the original signature device, and the another signature device except the original signature device and the proxy signature device, and the standard signature verification device is different from the standard signature computing device; where $ID_a$ is an identifier of the standard signature computing device, and the public parameter further includes $P_{pub}$.

With reference to the first possible implementation manner of the third aspect, in a second possible implementation manner of the third aspect, the first computing unit includes a first selecting module configured to randomly select $x_i$ from $Z^*_q$ according to a formula $x_i \in Z^*_q$, a first computing module configured to compute the public key according to a formula $P_i = x_iP$, and a second computing module configured to compute a second sub-private key according to a formula $D_i = sH(ID_i,P_i)$; where i ($1 \leq i \leq n$) is a sequence number of the proxy signature device, where n is a quantity of proxy signature devices; $x_i$ is a first sub-private key included in the private key of the proxy signature device; $D_i$ is the second sub-private key included in the private key of the proxy signature device; $P_i$ is the public key of the proxy signature device; $ID_i$ is an identifier of the proxy signature device; s is a master key; and the public parameter includes $H(\cdot)$ and q.

With reference to the second possible implementation manner of the third aspect, in a third possible implementation manner of the third aspect, the second computing unit includes an acquiring module configured to acquire an authorization signature computed by the original signature device, where the authorization signature includes $\omega$, $T_0$, and $V_0$, an authorization signature verification module configured to verify the authorization signature according to a formula $V_0P = P_{pub}H(ID_0,P_0) + P_0H_1(\omega,T_0,P_0) + T_0H_2(\omega,T_0,P_0)$, a second selecting module configured to randomly select $r_i$ from $Z^*_q$ according to a formula $r_i \in Z^*_q$ if it is verified that the authorization signature is valid, a third computing module configured to compute $T_i$ according to a formula $T_i = r_iP$, and a fourth computing module configured to compute $V_i$ according to a formula $V_i = D_i + x_iH_3(m,T_i,P_i) + r_iH_4(m,T_i,P_i)$, where the partial proxy signature includes $\omega$, $T_0$, $V_0$, $T_i$, and $V_i$; where $\omega$ includes identity information of the proxy signature device and identity information of the original signature device; $T_0$ is obtained through computation by the original signature device according to a formula $T_0 = r_0P$, where $r_0$ is randomly selected by the original signature device from $Z^*_q$ according to a formula $r_0 \in Z^*_q$; $V_0$ is obtained through computation by the original signature device according to a formula $V_0 = D_0 + x_0H_1(\omega,T_0,P_0) + r_0H_2(\omega,T_0,P_0)$; $x_0$ ($\in Z^*_q$) is a first sub-private key of the original signature device; $D_0(=sH(ID_0,P_0))$ is a second sub-private key of the original signature device; $ID_0$ is an identifier of the original signature device; is $P_0(=x_0P)$ is a public key of the original signature device; m is a message m input by an input end; and the public parameter further includes $H_3(\cdot)$, $H_4(\cdot)$, and $P_{pub}$.

According to a fourth aspect, a certificateless multi-proxy signature apparatus is provided, including an acquiring unit configured to acquire a multi-proxy signature after a standard signature verification device verifies that a standard signature is valid, where the standard signature includes T and V, where T is obtained through computation by a standard signature computing device according to a formula $T = rP$, and V is obtained through computation by the standard signature computing device according to a formula $V = D_a + x_aH_i(m,T,P_a) + rH_2(m,T,P_a)$; the multi-proxy signature is obtained through computation by a proxy signature device administrator according to a partial proxy signature of each proxy signature device; and the partial proxy signature is obtained through computation by the proxy signature device according to a private key of the proxy signature device, and a verification unit configured to verify the multi-proxy signature according to a public key of each proxy signature device; where r is randomly selected from $Z^*_q$ according to a formula $r \in Z^*_q$; a is a sequence number of the standard signature computing device and $0 \leq a \leq l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\cdot)$, $H_2(\cdot)$, and P, where P is a generator of G, and G is a group G whose order is a prime number q.

In a first possible implementation manner of the fourth aspect, $P_a$ is obtained through computation by the standard signature computing device according to a formula $P_a = x_aP$, where $x_a$ is randomly selected by the standard signature computing device from $Z^*_q$ according to a formula $x_a \in Z^*_q$, and $D_a$ is obtained through computation by the standard signature computing device according to a formula $D_a = sH(ID_a,P_a)$; where $ID_a$ is an identifier of the standard signature computing device, S is a master key, and the public parameter includes $H(\cdot)$ and q.

With reference to the first possible implementation manner of the fourth aspect, in a second possible implementation manner of the fourth aspect, the standard signature verification device verifies the standard signature according to a formula $VP = P_{pub}H(ID_a,P_a) + P_aH_1(m,T,P_a) + TH_2(m,T,P_a)$; the standard signature computing device is either of another signature device except an original signature device and the proxy signature device, and the original signature device; the standard signature verification device is any one of the proxy signature device, the original signature device, and the another signature device except the original signature device and the proxy signature device; and the standard signature verification device is different from the standard signature computing device; where the public parameter further includes $P_{pub}$.

With reference to the second possible implementation manner of the fourth aspect, in a third possible implementation manner of the fourth aspect, the acquiring unit includes a determining module configured to determine whether the proxy signature device administrator verifies, according to the partial proxy signature of each proxy signature device, that both of a formula $V_0P=P_{pub}H(ID_0,P_0)+P_0H_1(\omega,T_0,P_0)+T_0H_2(\omega,T_0,P_0)$ and a formula $V_iP=P_{pub}H(ID_i,P_i)+P_iH_3(m,T_i,P_i)+T_iH_4(m,T_i,P_i)$ hold, and a computing module configured to, if yes, compute the multi-proxy signature according to a formula $\sigma=(\omega,T_{MP},V_{MP})$; where $V_0$ is obtained through computation by the original signature device according to a formula $V_0=D_0+x_0H_1(\omega,T_0,P_0)+r_0H_2(\omega,T_0,P_0)$, $\omega$ includes identity information of the proxy signature device and identity information of the original signature device, $T_0$ is obtained through computation by the original signature device according to a formula $T=r_0P$, and $r_0$ is randomly selected by the original signature device from $Z^*_q$ according to a formula $r_0 \in Z^*_q$; $\sigma$ is the multi-proxy signature; $T_{MP}=(T_0, T_1, \ldots, T_n)$ where $T_i$ is obtained through computation by a proxy signature device with a sequence number of i according to a formula $T_i=r_iP$, where $r_i$ is randomly selected by the proxy signature device with the sequence number of i from $Z^*_q$ according to a formula $r_i \in Z^*_q$; $V_{MP}=\Sigma_{i=0}^n V_i$, where $V_i$ is obtained through computation by the proxy signature device with the sequence number of i according to a formula $V_i=D_i+x_iH_3(m,T_i,P_i)+r_iH_4(m,T_i,P_i)$, i ($1 \leq i \leq n$) is a sequence number of the proxy signature device, and n is a quantity of proxy signature devices; and the public parameter further includes $H_3(\bullet)$ and $H_4(\bullet)$.

With reference to the third possible implementation manner of the fourth aspect, in a fourth possible implementation manner of the fourth aspect, the verification unit includes a verification module configured to verify the multi-proxy signature according to a formula $V_{MP}P=P_{pub}\Sigma_{i=0}^n H(ID_i,P_i)+\Sigma_{i=1}^n P_iH_3(m,T_i,P_i)+\Sigma_{i=1}^n T_iH_4(m,T_i,P_i)+P_0H_1(\omega,T_0,P_0)+T_0H_2(\omega,T_0,P_0)$.

According to the certificateless multi-proxy signature method and apparatus provided in the embodiments of the present disclosure, a multi-proxy signature is computed by using a private key, and then the multi-proxy signature is verified according to a public key, compared with a multi-proxy signature based on bilinear pairings, a computing amount is decreased, thereby reducing computing time.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

A certificateless multi-proxy signature scheme is operated based on bilinear pairings, and the bilinear pairings involve a large computing amount and consume longer time in implementing a signature operation compared with other mechanisms. Generally, a computation cost of bilinear pairings is approximately more than 20 times that of scalar multiplication over elliptic curve group.

Figure 1:
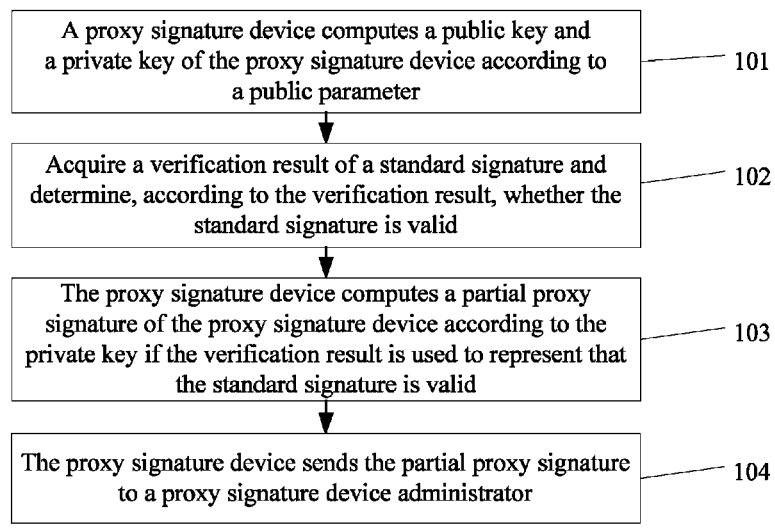
FIG. 1 is a flowchart of a certificateless multi-proxy signature method according to an embodiment.

To resolve the foregoing problem, an embodiment provides a certificateless multi-proxy signature method, and the method is executed by a proxy signature device. As shown in FIG. 1, the method may include 101. A proxy signature device computes a public key and a private key of the proxy signature device according to a public parameter.

The public key is corresponding to the private key.

In an implementation manner of this embodiment, in a process of implementing certificateless multi-proxy signature, first, a system may publish a public parameter. The public parameter may be acquired by any signature device, so that each signature device computes its own public key and private key according to the public parameter.

The any signature device in this embodiment may be any one of the following: another proxy signature device except the proxy signature device executing this step, an original signature device, and the like.

The public key and the private key are not limited in this embodiment and are technologies well known to a person skilled in the art, which are not described herein again.

102. Acquire a verification result of a standard signature and determine, according to the verification result, whether the standard signature is valid.

The standard signature includes T and V, where T is obtained through computation by a standard signature computing device according to a formula $T=rP$, and V is obtained through computation by the standard signature computing device according to a formula $V=D_a+x_aH_1(m,T,P_a)+rH_2(m,T,P_a)$, where r is randomly selected from $Z^*_q$ according to a formula $r \in Z^*_q$; a is a sequence number of the standard signature computing device and $0 \leq a \leq l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\bullet)$, $H_2(\bullet)$, and P, where P is a generator of G, and G is a group G whose order is a prime number q.

In an implementation manner of this embodiment, a standard signature verification device may first acquire the standard signature from the standard signature computing device, and then the proxy signature device may acquire the verification result of the standard signature from the standard signature verification device, where the verification result may be used to represent whether the standard signature is valid.

103. The proxy signature device computes a partial proxy signature of the proxy signature device according to the private key if the verification result is used to represent that the standard signature is valid.

In the process of implementing certificateless multi-proxy signature, the original signature device may authorize multiple proxy signature devices to perform multi-proxy signature. The multiple proxy signature devices may compute their partial proxy signatures according to their own private keys. A proxy signature device administrator may perform a corresponding operation on the partial proxy signatures of all the proxy signature devices to obtain a multi-proxy signature, and determine the multi-proxy signature as a signature of the original signature device.

To execute the subsequent step, first, the proxy signature device may compute the partial proxy signature of the proxy signature device according to the private key.

104. The proxy signature device sends the partial proxy signature to a proxy signature device administrator, so that after the proxy signature device administrator obtains a multi-proxy signature through computation according to the partial proxy signature, a multi-proxy signature verification device verifies the multi-proxy signature.

In an implementation manner of this embodiment, after the proxy signature device obtains its partial proxy signature through computation according to its own private key, the proxy signature device may send the partial proxy signature to the proxy signature device administrator. After receiving partial proxy signatures of all proxy signature devices, the proxy signature device administrator computes the multi-proxy signature according to the partial proxy signatures of all the proxy signature devices. The verification device may verify the multi-proxy signature.

It should be noted that the proxy signature device administrator may be any proxy signature device.

In this solution, a multi-proxy signature is computed according to a private key, and then the multi-proxy signature is verified according to a public key. Because computing time (which may include time for computing the public key and the private key) of the method in the present disclosure is less than time for computing bilinear pairings, compared with a multi-proxy signature based on the bilinear pairings, this solution decreases a computing amount, thereby reducing computing time.

Figure 2:
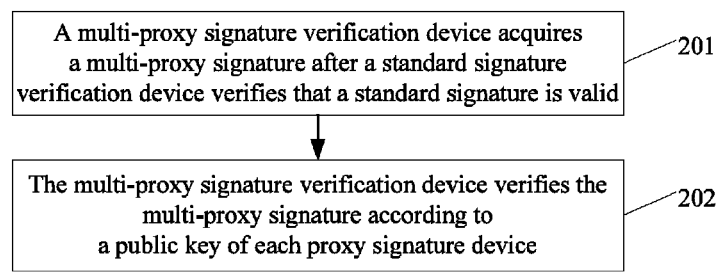
FIG. 2 is a flowchart of another certificateless multi-proxy signature method according to an embodiment.

An embodiment provides another certificateless multi-proxy signature method, where the method may be executed by a multi-proxy signature verification device. As shown in FIG. 2, the method may include 201. A multi-proxy signature verification device acquires a multi-proxy signature after a standard signature verification device verifies that a standard signature is valid.

The standard signature includes T and V, where T is obtained through computation by a standard signature computing device according to a formula T=rP, and V is obtained through computation by the standard signature computing device according to a formula $V=D_a+x_aH_1(m,T,P_a)+rH_2(m,T,P_a)$; the multi-proxy signature is obtained through computation by a proxy signature device administrator according to a partial proxy signature of each proxy signature device; and the partial proxy signature is obtained through computation by the proxy signature device according to a private key of the proxy signature device, where r is randomly selected from $Z^*_q$ according to a formula $r \in Z^*_q$; a is a sequence number of the standard signature computing device and $0 \leq a \leq l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\bullet)$, $H_2(\bullet)$, and P, where P is a generator of G, and G is a group G whose order is a prime number q.

The multi-proxy signature may be obtained through computation by the proxy signature device administrator according to the partial proxy signature of each proxy signature device.

The partial proxy signature may be obtained through computation by a corresponding proxy signature device according to a private key of the proxy signature device, where the public key is corresponding to the private key.

In an implementation manner of this embodiment, the multi-proxy signature may be mainly used to check whether a transmitted message is complete.

For example, to ensure reliability of a message m (which may be input by an input end) received by a receive end, the message m may be encrypted, that is, a multi-proxy signature of the message m may be computed, and the multi-proxy signature is verified.

202. The multi-proxy signature verification device verifies the multi-proxy signature according to a public key of each proxy signature device.

In an implementation manner of this embodiment, the verification device verifies the multi-proxy signature according to the public key of each proxy signature device. If a verification result is that the multi-proxy signature is valid, it indicates that the message m may be complete. If the verification result is that the multi-proxy signature is invalid, it indicates that the message m may be incomplete.

In this solution, a multi-proxy signature is computed according to a private key, and then the multi-proxy signature is verified according to a public key. Because computing time (that is, time for computing the public key and the private key) of the method in the present disclosure is less than time for computing bilinear pairings, compared with a multi-proxy signature based on the bilinear pairings, this solution decreases a computing amount, thereby reducing computing time.

Figure 3A:
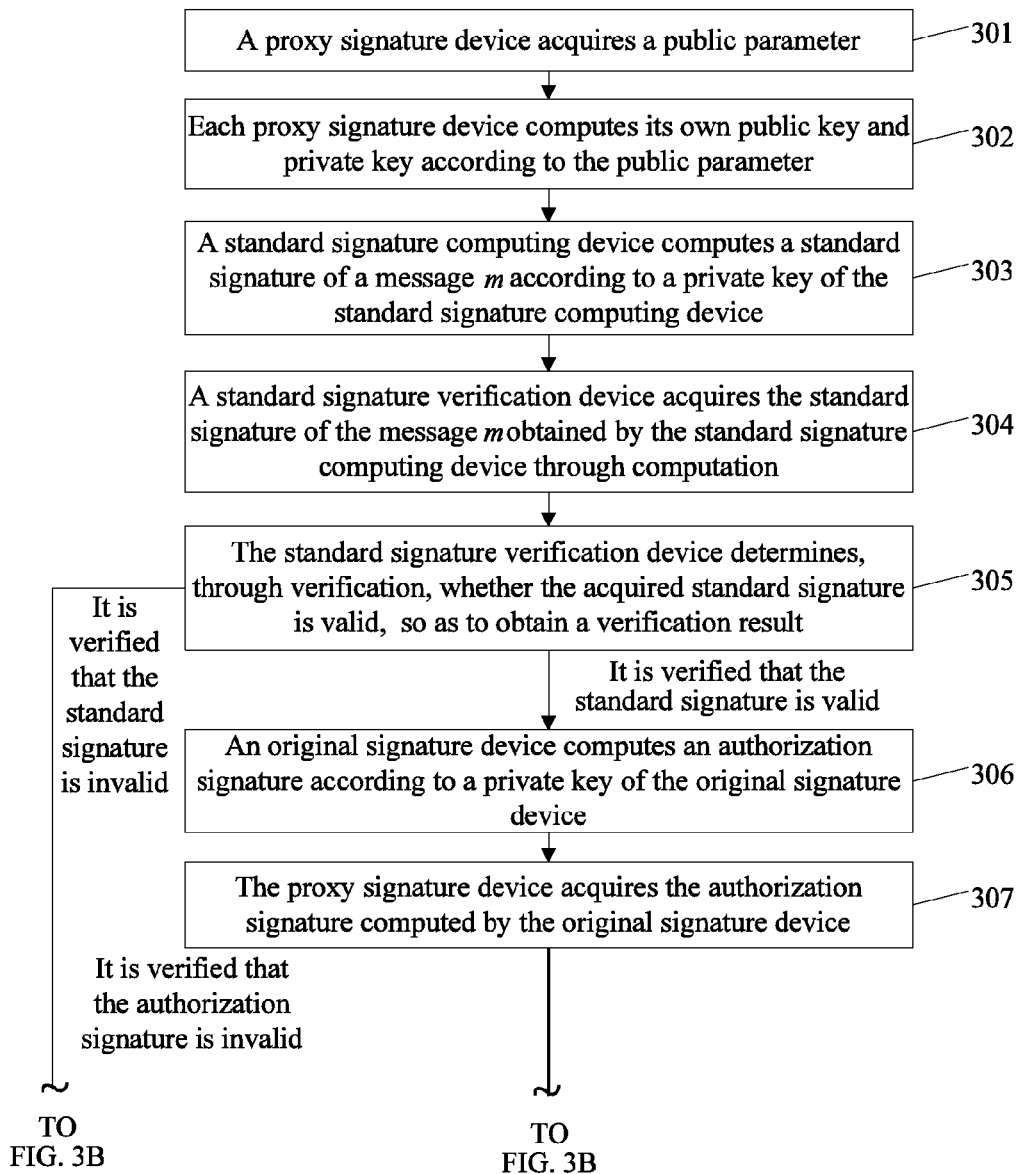
FIG. 3A and FIG. 3B are a flowchart of still another certificateless multi-proxy signature method according to an embodiment.
Figure 3B:
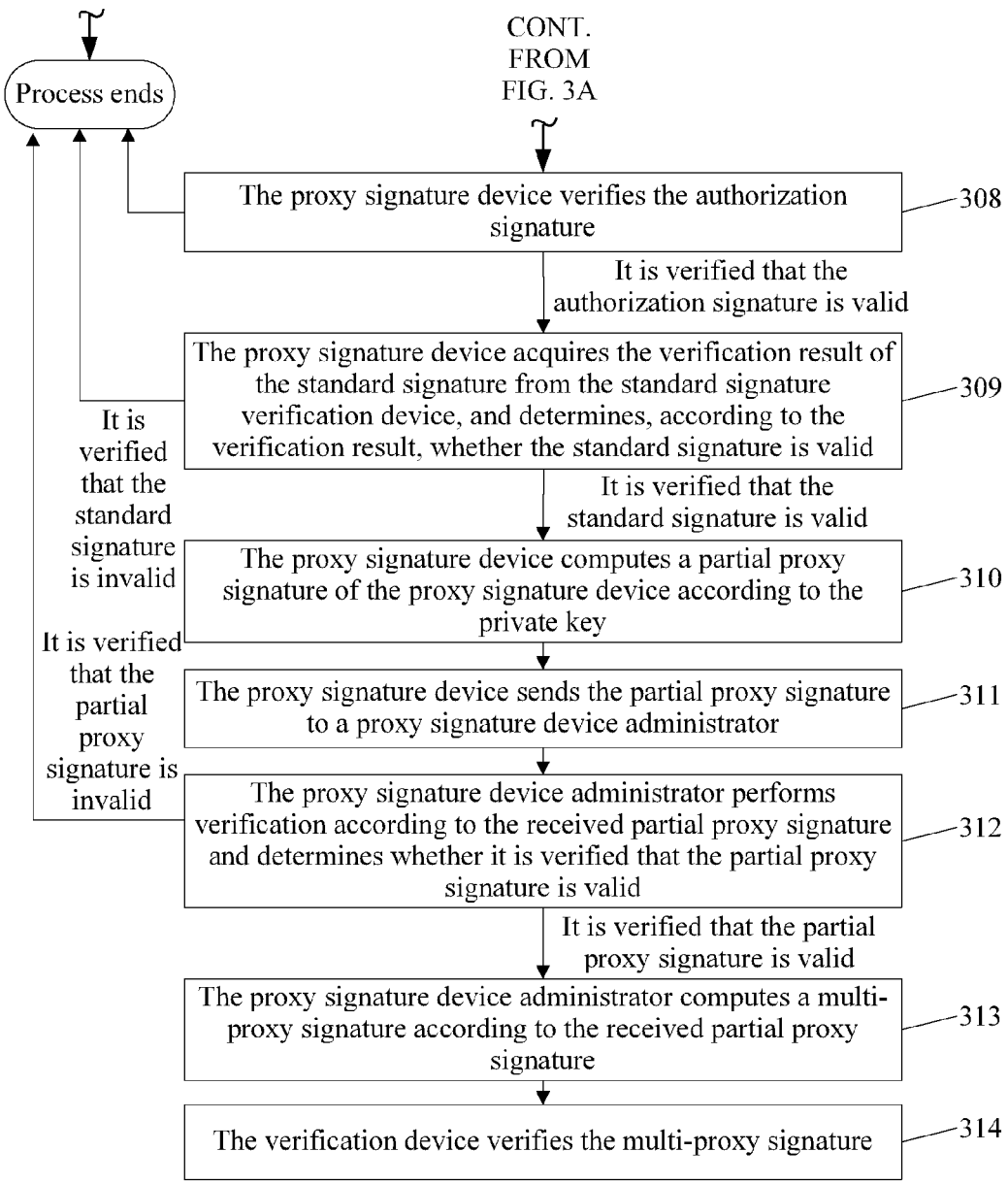

An embodiment provides still another certificateless multi-proxy signature method, where the method further extends and optimizes the methods shown in FIG. 1 and FIG. 2. As shown in FIG. 3A and FIG. 3B, the method may include 301. A proxy signature device acquires a public parameter.

In an implementation manner of this embodiment, a private key generator (PKG) selects a group G whose order is a prime number q and randomly selects $s \in Z^*_q$ as a master key, to compute a corresponding system public key $P_{pub}=sP$, where P is a generator of G. Moreover, the PKG may randomly select five different cryptographic hash functions $H,H_1,H_2,H_3,H_4:\{0,1\}^* \to Z^*_q$.

The public parameter may include G, P, q, H(•), $H_1$(•), $H_2$(•), $H_3$(•), $H_4$(•), and $P_{pub}$, that is, params=(G,P,q,H,$H_1$,$H_2$,$H_3$,$H_4$,$P_{pub}$).

The public parameter in this embodiment may be acquired by any device (a device such as the proxy signature device or an original signature device).

302. Each proxy signature device computes its own public key and private key according to the public parameter.

A signature device in this embodiment may include the proxy signature device, the original signature device, and another signature device except the proxy signature device and the original signature device.

Further, the private key may include a first sub-private key and a second sub-private key.

Further, that each proxy signature device computes its own public key and private key according to the public parameter includes randomly selecting, by the proxy signature device, $x_i$ from $Z^*_q$ according to a formula $x_i \in Z^*_q$; computing the public key according to a formula $P_i=x_iP$; and computing the second sub-private key according to a formula $D_i=sH(ID_i,P_i)$, where i (1≤i≤n) is a sequence number of the proxy signature device, where n is a quantity of proxy signature devices; $x_i$ is the first sub-private key included in the private key of the proxy signature device; $D_i$ is the second sub-private key included in the private key of the proxy signature device; $P_i$ is the public key of the proxy signature device; $ID_i$ is an identifier of the proxy signature device; s is the master key; and the public parameter includes H(•) and q.

For example, a proxy signature device with a sequence number of 1 (that is, i=1) may randomly select $x_1$ from $Z^*_q$ according to a formula $x_1 \in Z^*_q$, compute a public key according to a formula $P_1=x_1P$, and compute a second sub-private key according to a formula $D_1=sH(ID_1,P_1)$, where a private key of the proxy signature device with the sequence number of 1 may include $(x_1,D_1)$. A public key and a private key of another proxy signature device may be computed by using a same method as the foregoing enumerated method, which is not described herein again.

Further, that the original signature device computes its own public key and private key according to the public parameter may include randomly selecting, by the original signature device (which may be understood as i=0), $x_0$ from $Z^*_q$ according to a formula $x_0 \in Z^*_q$; computing the public key according to a formula $P_0=x_0P$; and computing the second sub-private key according to a formula $D_0=sH(ID_0,P_0)$, where $P_0$ is a public key of the original signature device, $x_0$ is a first sub-private key of the original signature device, $D_0$ is a second sub-private key of the original signature device, and $ID_0$ is an identifier of the original signature device.

It should be noted that, multiple signature devices (which may include the original signature device and the proxy signature device) may simultaneously execute this step, that is, multiple signature devices simultaneously compute their respective public keys and private keys.

303. A standard signature computing device computes a standard signature of a message m according to a private key of the standard signature computing device.

The standard signature may include T and V.

The standard signature computing device may compute T according to a formula T=rP, and may compute V according to a formula $V=D_a+x_aH_1(m,T,P_a)+rH_2(m,T,P_a)$.

Further, $P_a$ may be obtained through computation by the standard signature computing device according to a formula $P_a=x_aP$, where $x_a$ is randomly selected by the standard signature computing device from $Z^*_q$ according to a formula $x_a \in Z^*_q$, and $D_a$ is obtained through computation by the standard signature computing device according to a formula $D_a=sH(ID_a,P_a)$; where $ID_a$ is an identifier of the standard signature computing device, s is the master key, and the public parameter includes H(•) and q.

Further, the standard signature computing device is any one of the proxy signature device, the original signature device, and the another signature device except the original signature device and the proxy signature device; where r is randomly selected from $Z^*_q$ according to a formula $r \in Z^*_q$; a is a sequence number of the standard signature computing device and 0≤a≤l, where l is a quantity of standard signature computing devices plus one; $x_a$ is a first sub-private key included in the private key of the standard signature computing device; $D_a$ is a second sub-private key included in the private key of the standard signature computing device; m is a message m input by a transmit end; $P_a$ is a public key of the standard signature computing device; and the public parameter includes $H_1$(•), $H_2$(•), and P, where P is a generator of G, and G is a group G whose order is a prime number q.

If the standard signature computing device is the proxy signature device, that a proxy signature device with a sequence number of i computes the standard signature may include acquiring, by the proxy signature device with the sequence number of i, the message m input by the transmit end; randomly selecting r from $Z^*_q$ according to a formula $r \in Z^*_q$; computing T according to a formula T=rP; and computing V according to a formula $V=D_i+x_iH_1(m,T,P_i)+rH_2(m,T,P_i)$, so that the verification device checks whether the standard signature of the message m is valid, where the standard signature may include V and T.

If the standard signature computing device is the original signature device, that the original signature device computes the standard signature may include acquiring, by the original signature device, the message m input by the transmit end; randomly selecting r from $Z^*_q$ according to a formula $r \in Z^*_q$; computing T according to a formula T=rP; and computing V according to a formula $V=D_0+x_0H_1(m,T,P_0)+rH_2(m,T,P_0)$, so that the verification device checks whether the standard signature of the message m is valid, where the standard signature may include V and T.

If the standard signature computing device is the another signature device except the original signature device and the proxy signature device, that the another signature device computes the standard signature may include acquiring, by the another signature device, the message m input by the transmit end; randomly selecting r from $Z^*_q$ according to a formula $r \in Z^*_q$; computing T according to a formula T=rP; and computing V according to a formula $V=D_b+x_bH_1(m,T,P_b)+rH_2(m,T,P_b)$, so that the verification device checks whether the standard signature of the message m is valid, where the standard signature may include V and T, where b is a sequence number of the another signature device.

It should be noted that, the standard signature computing device in this embodiment may be a signature device randomly selected from the proxy signature device, the original signature device, and the another signature device except the original signature device and the proxy signature device, and a specific selecting method may be set according to an actual need, which is not described herein again.

304. A standard signature verification device acquires the standard signature, obtained by the standard signature computing device through computation, of the message m.

305. The standard signature verification device checks whether the acquired standard signature is valid, so as to obtain a verification result. If it is verified that the standard signature is valid, execute step 306; if it is verified that the standard signature is invalid, end the procedure.

Further, the standard signature verification device may verify the standard signature according to a formula $VP=P_{pub}H(ID_a,P_a)+P_aH_1(m,T,P_a)+TH_2(m,T,P_a)$. If the equation holds, the standard signature may be valid; if the equation does not hold, the standard signature may be invalid, where $ID_a$ is an identifier of the standard signature computing device, and the public parameter further includes $P_{pub}$.

Further, the standard signature verification device may be any one of the proxy signature device, the original signature device, and the another signature device except the original signature device and the proxy signature device.

If the standard signature verification device is any proxy signature device, the checking whether the acquired standard signature is valid may include verifying the standard signature according to a formula $VP=P_{pub}H(ID_i,P_i)+P_iH_1(m,T,P_i)+TH_2(m,T,P_i)$, so that the proxy signature device computes a partial proxy signature according to the private key after it is verified that the standard signature is valid.

If the formula $VP=P_{pub}H(ID_i,P_i)+P_iH_1(m,T,P_i)+TH_2(m,T,P_i)$ holds, it indicates that the standard signature may be valid; if the formula $VP=P_{pub}H(ID_i,P_i)+P_iH_1(m,T,P_i)+TH_2(m,T,P_i)$ does not hold, it indicates that the standard signature may be invalid.

If the standard signature verification device is the original signature device, the checking whether the acquired standard signature is valid may include verifying the standard signature according to a formula $VP=P_{pub}H(ID_0,P_0)+P_0H_1(m,T,P_0)+TH_2(m,T,P_0)$, so that the proxy signature device computes a partial proxy signature according to the private key after it is verified that the standard signature is valid.

If the formula $VP=P_{pub}H(ID_0,P_0)+P_0H_1(m,T,P_0)+TH_2(m,T,P_0)$ holds, it indicates that the standard signature may be valid; if the formula $VP=P_{pub}H(ID_0,P_0)+P_0H_1(m,T,P_0)+TH_2(m,T,P_0)$ does not hold, it indicates that the standard signature may be invalid.

If the standard signature verification device is any other signature device except the proxy signature device and the original signature device, the checking whether the acquired standard signature is valid may include verifying the standard signature according to a formula $VP=P_{pub}H(ID_b,P_b)+P_bH_1(m,T,P_b)+TH_2(m,T,P_b)$, so that the proxy signature device computes a partial proxy signature according to the private key after it is verified that the standard signature is valid.

If the formula $VP=P_{pub}H(ID_b,P_b)+P_bH_1(m,T,P_b)+TH_2(m,T,P_b)$ holds, it indicates that the standard signature may be valid; if the formula $VP=P_{pub}H(ID_b,P_b)+P_bH_1(m,T,P_b)+TH_2(m,T,P_b)$ does not hold, it indicates that the standard signature may be invalid.

Further, the standard signature verification device is different from the standard signature computing device.

306. An original signature device computes an authorization signature according to a private key of the original signature device.

In certificateless multi-proxy signature, the original signature device may authorize another proxy signature device to perform signature. In this step, the original signature device mainly performs authorization on the proxy signature device. The original signature device may first compute, according to the private key of the original signature device, an authorization signature of each proxy signature device. If each proxy signature device verifies that a corresponding authorization signature is valid, it indicates that the proxy signature device is authorized to perform multi-proxy signature.

The authorization signature may include $\omega$, $T_0$, and $V_0$.

Further, the original signature device may compute $V_0$ according to a formula $V_0=D_0+x_0H_1(\omega,T_0,P_0)+r_0H_2(\omega,T_0,P_0)$, and compute $T_0$ according to a formula $T_0=r_0P$, where $\omega$ may include but is not limited to identity information of a proxy signature device to be authorized, identity information of the original signature device, an authorization message type, an authorization period, and the like.

307. The proxy signature device acquires the authorization signature computed by the original signature device.

308. The proxy signature device verifies the authorization signature. If it is verified that the authorization signature is valid, execute step 309; if it is verified that the authorization signature is invalid, end the procedure or request a valid authorization signature from the original signature device.

Further, that the proxy signature device verifies the authorization signature may include verifying, by the proxy signature device, the authorization signature according to a formula $V_0P=P_{pub}H(ID_0,P_0)+P_0H_1(\omega,T_0,P_0)+T_0H_2(\omega,T_0,P_0)$.

If the formula $V_0P=P_{pub}H(ID_0,P_0)+P_0H_1(\omega,T_0,P_0)+T_0H_2(\omega,T_0,P_0)$ holds, it indicates that the authorization signature may be valid; if the formula $V_0P=P_{pub}H(ID_0,P_0)+P_0H_1(\omega,T_0,P_0)+T_0H_2(\omega,T_0,P_0)$ does not hold, it indicates that the authorization signature may be invalid.

Further, the proxy signature device may acquire a multi-proxy key, where the multi-proxy key may include $P_i$, $T_0$, and $V_0$, that is, $(x_i,D_i)$, $T_0$, and $V_0$.

309. The proxy signature device acquires the verification result of the standard signature from the standard signature verification device, and determines, according to the verification result, whether the standard signature is valid. If it is verified that the standard signature is valid, execute step 310; if it is verified that the standard signature is invalid, end the procedure.

310. The proxy signature device computes a partial proxy signature of the proxy signature device according to the private key.

In an implementation manner of this embodiment, that the proxy signature device computes a partial proxy signature of the proxy signature device according to the private key may be that each proxy signature device computes its partial proxy signature according to the multi-proxy key.

Further, that the proxy signature device with the sequence number of i computes a partial proxy signature may include randomly selecting, by the proxy signature device with the sequence number of i, $r_i$ from $Z^*_q$ according to a formula $r_i \in Z^*_q$; computing $T_i$ according to a formula $T_i=r_iP$; computing $V_i$ according to a formula $V_i=D_i+x_iH_3(m,T_i,P_i)+r_iH_4(m,T_i,P_i)$, where the partial proxy signature may include $\omega$, $T_0$, $V_0$, $T_i$, and $V_i$.

For example, a proxy signature device with a sequence number of 1 (that is, i=1) randomly selects $r_1$ from $Z^*_q$ according to a formula $r_1 \in Z^*_q$, computes $T_1$ according to a formula $T_1=r_1P$, and computes $V_1$ according to a formula $V_1=D_1+x_1H_3(m,T_1,P_1)+r_1H_4(m,T_1,P_1)$, where a partial proxy signature may include $\omega$, $T_0$, $V_0$, $T_1$, and $V_1$. Another proxy signature device computes its own partial proxy signature according to the private key by using a same method as the foregoing enumerated method, which is described in this step.

It should be noted that, in this step, multiple proxy signature devices may simultaneously compute their respective partial proxy signatures.

311. The proxy signature device sends the partial proxy signature to a proxy signature device administrator.

It should be noted that, in this step, all the multiple proxy signature devices may send their respective partial proxy signatures to the proxy signature device administrator.

312. The proxy signature device administrator performs verification according to the received partial proxy signature and determines whether it is verified that the partial proxy signature is valid; if it is verified that the partial proxy signature is valid, step 313 is executed; if it is verified that the partial proxy signature is invalid, the procedure ends.

Further, the proxy signature device administrator verifies the formula $V_0P=P_{pub}H(ID_0,P_0)+P_0H_1(\omega,T_0,P_0)+T_0H_2(\omega,T_0,P_0)$ and a formula $V_iP=P_{pub}H(ID_i,P_i)+P_iH_3(m,T_i,P_i)+T_iH_4(m,T_i,P_i)$ according to the received partial proxy signature.

If all formulas included in the formula $V_0P=P_{pub}H(ID_0,P_0)+P_0H_1(\omega,T_0,P_0)+T_0H_2(\omega,T_0,P_0)$ and the formula $V_iP=P_{pub}H(ID_i,P_i)+P_iH_3(m,T_i,P_i)+T_iH_4(m,T_i,P_i)$ hold, it indicates that the partial proxy signature may be valid through verification; if all formulas included in the formula $V_0P=P_{pub}H(ID_0,P_0)+P_0H_1(\omega,T_0,P_0)+T_0H_2(\omega,T_0,P_0)$ and the formula $V_iP=P_{pub}H(ID_i,P_i)+P_iH_3(m,T_i,P_i)+T_iH_4(m,T_i,P_i)$ hold, it indicates that the partial proxy signature may be invalid through verification.

313. The proxy signature device administrator computes a multi-proxy signature according to the received partial proxy signature.

Further, the proxy signature device administrator may compute the multi-proxy signature according to a formula $\sigma=(\omega,T_{MP},V_{MP})$, where $\sigma$ is the multi-proxy signature, $T_{MP}=(T_0, T_1, \ldots, T_n)$, and $V_{MP}=\Sigma_{i=0}^{n}V_i$.

314. The verification device verifies the multi-proxy signature.

Further, the verification device may verify the multi-proxy signature according to a formula $V_{MP}P=P_{pub}\Sigma_{i=0}^{n}H(ID_i,P_i)+\Sigma_{i=1}^{n}P_iH_3(m,T_i,P_i)+\Sigma_{i=1}^{n}T_iH_4(m,T_i,P_i)+P_0H_1(\omega,T_0,P_0)+T_0H_2(\omega,T_0,P_0)$.

If the formula $V_{MP}P=P_{pub}\Sigma_{i=0}^{n}H(ID_i,P_i)+\Sigma_{i=1}^{n}P_iH_3(m,T_i,P_i)+\Sigma_{i=1}^{n}T_iH_4(m,T_i,P_i)+P_0H_1(\omega,T_0,P_0)+T_0H_2(\omega,T_0,P_0)$ holds, it indicates that the multi-proxy signature may be valid; if the formula $V_{MP}P=P_{pub}\Sigma_{i=0}^{n}H(ID_i,P_i)+\Sigma_{i=1}^{n}P_iH_3(m,T_i,P_i)+\Sigma_{i=1}^{n}T_iH_4(m,T_i,P_i)+P_0H_1(\omega,T_0,P_0)+T_0H_2(\omega,T_0,P_0)$ does not hold, it indicates that the multi-proxy signature may be invalid.

In this solution, a multi-proxy signature is computed according to a private key, and then the multi-proxy signature is verified according to a public key. Because computing time (which may include time for computing the public key and the private key) of the method in the present disclosure is less than time for computing bilinear pairings, compared with a multi-proxy signature based on the bilinear pairings, this solution decreases a computing amount, thereby reducing computing time. In addition, no certificate is introduced in computing the public key, ensuring that no certificate is disclosed. Computing the private key according to the public key can enable the public key and the private key to restrict each other and avoid a public key replacement attack.

The following provides some virtual apparatus embodiments, and these virtual apparatus embodiments are respectively corresponding to the method embodiments provided above.

Figure 4:
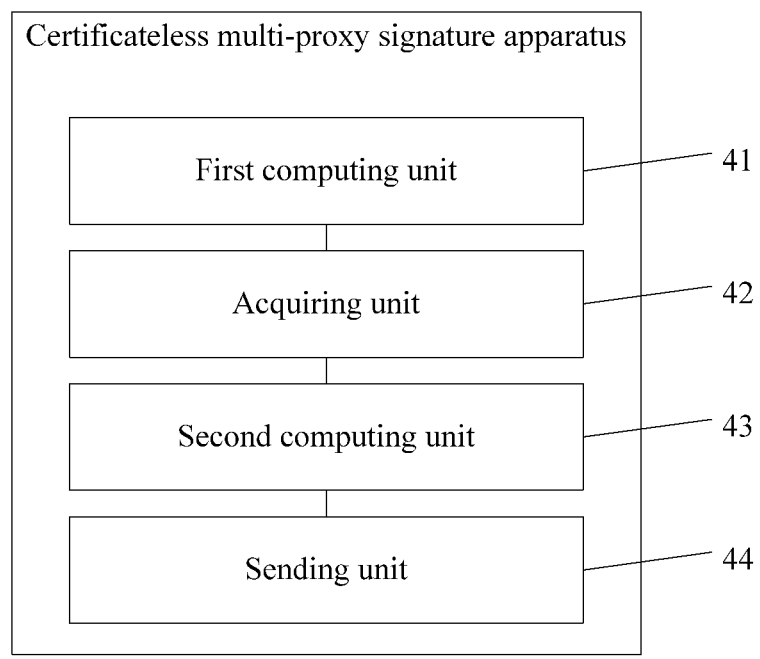
FIG. 4 is a schematic structural diagram of a virtual certificateless multi-proxy signature apparatus according to an embodiment.

An embodiment provides a certificateless multi-proxy signature apparatus. As shown in FIG. 4, the apparatus may include a first computing unit 41 configured to compute a public key and a private key of a proxy signature device according to a public parameter, where the public key is corresponding to the private key, an acquiring unit 42 configured to acquire a verification result of a standard signature, and determine, according to the verification result, whether the standard signature is valid, where the standard signature includes T and V, where T is obtained through computation by a standard signature computing device according to a formula $T=rP$, and V is obtained through computation by the standard signature computing device according to a formula $V=D_a+x_aH_1(m,T,P_a)+rH_2(m,T,P_a)$, a second computing unit 43 configured to compute a partial proxy signature of the proxy signature device according to the private key if the verification result is used to represent that the standard signature is valid, and a sending unit 44 configured to send the partial proxy signature to a proxy signature device administrator, so that after the proxy signature device administrator obtains a multi-proxy signature through computation according to the partial proxy signature, a multi-proxy signature verification device verifies the multi-proxy signature, where r is randomly selected from $Z^*_q$ according to a formula $r \in Z^*_q$; a is a sequence number of the standard signature computing device and $0 \le a \le l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\bullet)$, $H_2(\bullet)$, and P, where P is a generator of G, and G is a group G whose order is a prime number q.

In this solution, a multi-proxy signature is computed according to a private key, and then the multi-proxy signature is verified according to a public key. Because computing time (which may include time for computing the public key and the private key) of the method in the present disclosure is less than time for computing bilinear pairings, compared with a multi-proxy signature based on the bilinear pairings, this solution decreases a computing amount, thereby reducing computing time.

Figure 5:
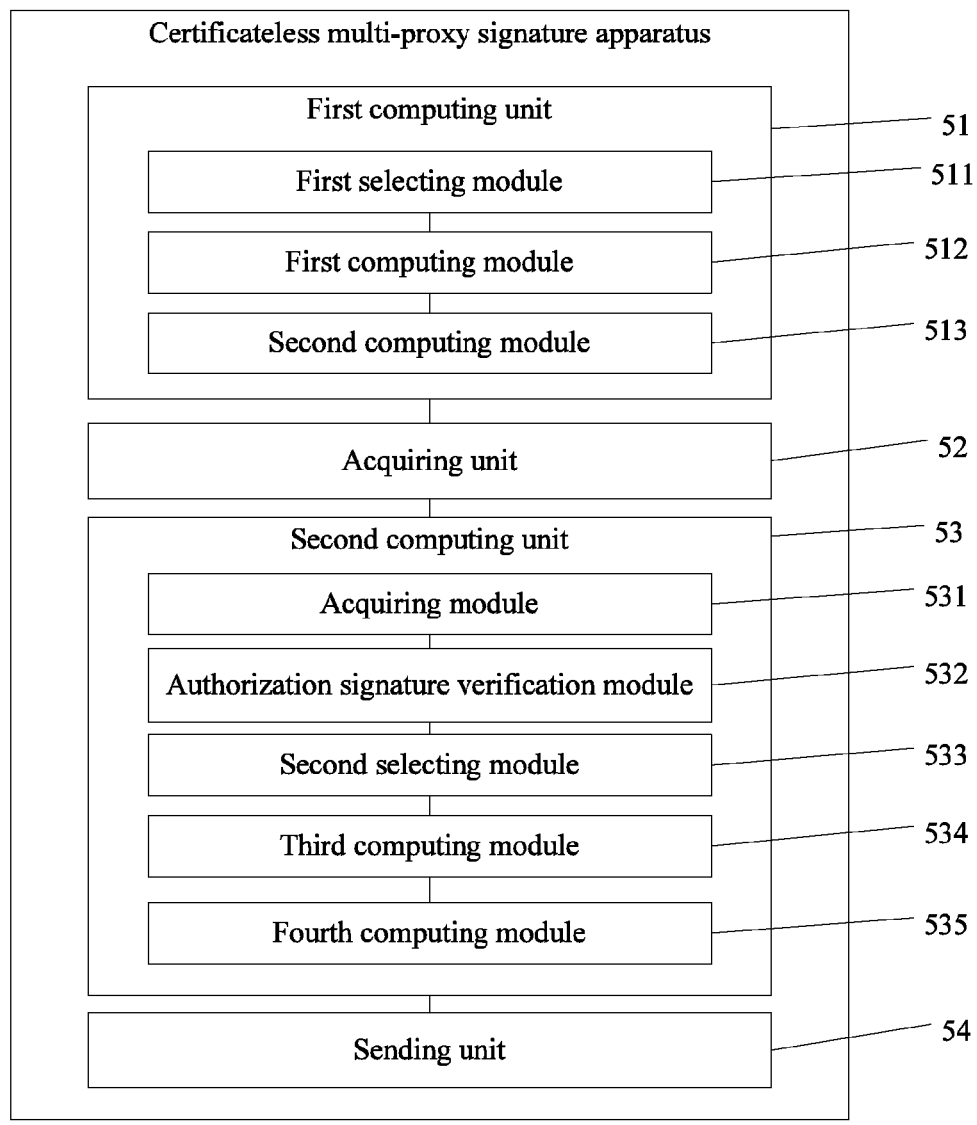
FIG. 5 is a schematic structural diagram of another virtual certificateless multi-proxy signature apparatus according to an embodiment.

An embodiment provides another certificateless multi-proxy signature apparatus, and the apparatus further extends and optimizes the apparatus shown in FIG. 4. As shown in FIG. 5, the apparatus may include a first computing unit 51 configured to compute a public key and a private key of a proxy signature device according to a public parameter, where the public key is corresponding to the private key, an acquiring unit 52 configured to acquire a verification result of a standard signature, and determine, according to the verification result, whether the standard signature is valid, where the standard signature includes T and V, where T is obtained through computation by a standard signature computing device according to a formula $T=rP$, and V is obtained through computation by the standard signature computing device according to a formula $V=D_a+x_aH_1(m,T,P_a)+rH_2(m,T,P_a)$, a second computing unit 53 configured to compute a partial proxy signature of the proxy signature device according to the private key if the verification result is used to represent that the standard signature is valid, and a sending unit 54 configured to send the partial proxy signature to a proxy signature device administrator, so that after the proxy signature device administrator obtains a multi-proxy signature through computation according to the partial proxy signature, a multi-proxy signature verification device verifies the multi-proxy signature, where r is randomly selected from $Z^*_q$ according to a formula $r \in Z^*_q$; a is a sequence number of the standard signature computing device and $0 \le a \le l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\cdot)$, $H_2(\cdot)$, and P, where P is a generator of G, and G is a group G whose order is a prime number q.

Further, the standard signature computing device is any one of the proxy signature device, an original signature device, and another signature device except the original signature device and the proxy signature device.

The verification result is obtained after a standard signature verification device verifies the standard signature according to a formula $VP=P_{pub}H(ID_a,P_a)+P_aH_1(m,T,P_a)+TH_2(m,T,P_a)$, where the standard signature verification device is any one of the proxy signature device, the original signature device, and the another signature device except the original signature device and the proxy signature device, and the standard signature verification device is different from the standard signature computing device; where $ID_a$ is an identifier of the standard signature computing device, and the public parameter further includes $P_{pub}$.

Further, the first computing unit 51 includes a first selecting module 511 configured to randomly select $x_i$ from $Z^*_q$ according to a formula $x_i \in Z^*_q$, a first computing module 512 configured to compute the public key according to a formula, $P_i=x_iP$, and a second computing module 513 configured to compute a second sub-private key according to a formula $D_i=sH(ID_i,P_i)$; where i ($1 \leq i \leq n$) is a sequence number of the proxy signature device, where n is a quantity of proxy signature devices; $x_i$ is a first sub-private key included in the private key of the proxy signature device; $D_i$ is the second sub-private key included in the private key of the proxy signature device; $P_i$ is the public key of the proxy signature device; $ID_i$ is an identifier of the proxy signature device; s is a master key; and the public parameter includes $H(\cdot)$ and q.

Further, the second computing unit 53 includes an acquiring module 531 configured to acquire an authorization signature computed by the original signature device, where the authorization signature includes ω, $T_0$, and $V_0$, an authorization signature verification module 532 configured to verify the authorization signature according to a formula $V_0P=P_{pub}H(ID_0,P_0)+P_0H_1(\omega,T_0,P_0)+T_0H_2(\omega,T_0,P_0)$, a second selecting module 533 configured to randomly select $r_i$ from $Z^*_q$ according to a formula $r_i \in Z^*_q$ if it is verified that the authorization signature is valid, a third computing module 534 configured to compute $T_i$ according to a formula $T_i=r_iP$, and a fourth computing module 535 configured to compute $V_i$ according to a formula $V_i=D_i+x_iH_3(m,T_i,P_i)+r_iH_4(m,T_i,P_i)$, where the partial proxy signature includes ω, $T_0$, $V_0$, $T_i$, and $V_i$; where ω includes identity information of the proxy signature device and identity information of the original signature device; $T_0$ is obtained through computation by the original signature device according to a formula $T_0=r_0P$, where $r_0$ is randomly selected by the original signature device from $Z^*_q$ according to a formula $r_0 \in Z^*_q$; $V_0$ is obtained through computation by the original signature device according to a formula $V_0=D_0+x_0H_1(\omega,T_0,P_0)+r_0H_2(\omega,T_0,P_0)$; $x_0(\in Z^*_q)$ is a first sub-private key of the original signature device; $D_0(=sH(ID_0,P_0))$ is a second sub-private key of the original signature device; $ID_0$ is an identifier of the original signature device; $P_0(=x_0P)$ is a public key of the original signature device; m is a message m input by an input end; and the public parameter further includes $H_3(\cdot)$, $H_4(\cdot)$, and $P_{pub}$.

In this solution, a multi-proxy signature is computed according to a private key, and then the multi-proxy signature is verified according to a public key. Because computing time (which may include time for computing the public key and the private key) of the method in the present disclosure is less than time for computing bilinear pairings, compared with a multi-proxy signature based on the bilinear pairings, this solution decreases a computing amount, thereby reducing computing time. In addition, no certificate is introduced in computing the public key, ensuring that no certificate is disclosed. Computing the private key according to the public key can enable the public key and the private key to restrict each other and avoid a public key replacement attack.

Figure 6:
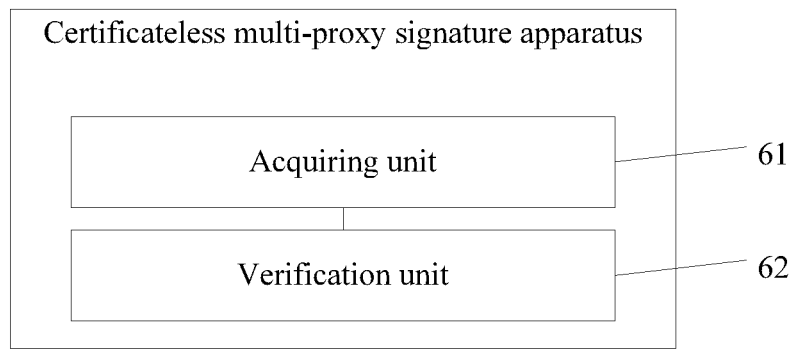
FIG. 6 is a schematic structural diagram of still another virtual certificateless multi-proxy signature apparatus according to an embodiment.

An embodiment provides another certificateless multi-proxy signature apparatus. As shown in FIG. 6, the apparatus includes an acquiring unit 61 configured to acquire a multi-proxy signature after a standard signature verification device verifies that a standard signature is valid, where the standard signature includes T and V, where T is obtained through computation by a standard signature computing device according to a formula T=rP, and V is obtained through computation by the standard signature computing device according to a formula $V=D_a+x_aH_1(m,T,P_a)+rH_2(m,T,P_a)$; the multi-proxy signature is obtained through computation by a proxy signature device administrator according to a partial proxy signature of each proxy signature device; and the partial proxy signature is obtained through computation by the proxy signature device according to a private key of the proxy signature device, and a verification unit 62 configured to verify the multi-proxy signature according to a public key of each proxy signature device; where r is randomly selected from $Z^*_q$ according to a formula $r \in Z^*_q$; a is a sequence number of the standard signature computing device and $0 \leq a \leq l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\cdot)$, $H_2(\cdot)$, and P, where P is a generator of G, and G is a group G whose order is a prime number q.

In this solution, a multi-proxy signature is computed according to a private key, and then the multi-proxy signature is verified according to a public key. Because computing time (which may include time for computing the public key and the private key) of the method in the present disclosure is less than time for computing bilinear pairings, compared with a multi-proxy signature based on the bilinear pairings, this solution decreases a computing amount, thereby reducing computing time.

Figure 7:
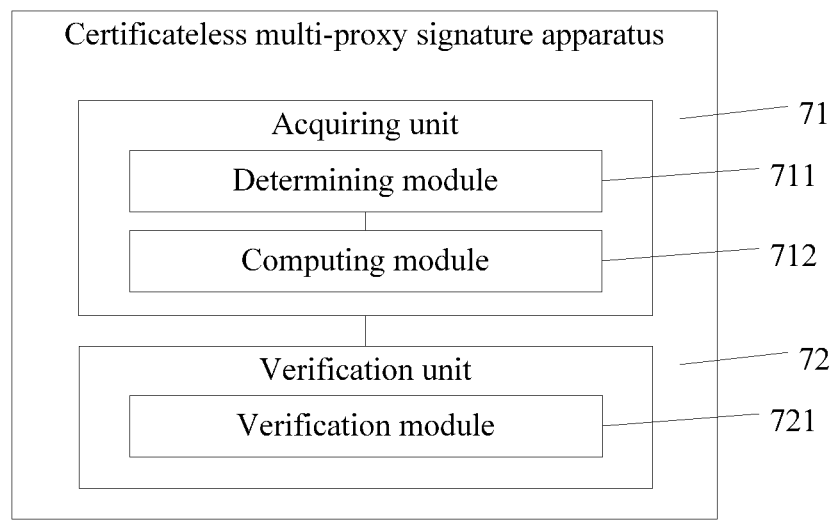
FIG. 7 is a structural schematic diagram of still another virtual certificateless multi-proxy signature apparatus according to an embodiment.

An embodiment provides another certificateless multi-proxy signature apparatus, and the apparatus further extends and optimizes the apparatus shown in FIG. 6. As shown in FIG. 7, the apparatus includes an acquiring unit 71 configured to acquire a multi-proxy signature after a standard signature verification device verifies that a standard signature is valid, where the standard signature includes T and V, where T is obtained through computation by a standard signature computing device according to a formula T=rP, and V is obtained through computation by the standard signature computing device according to a formula $V=D_a+x_aH_1(m,T,P_a)+rH_2(m,T,P_a)$; the multi-proxy signature is obtained through computation by a proxy signature device administrator according to a partial proxy signature of each proxy signature device; and the partial proxy signature is obtained through computation by the proxy signature device according to a private key of the proxy signature device, and a verification unit 72 configured to verify the multi-proxy signature according to a public key of each proxy signature device; where r is randomly selected from $Z^*_q$ according to a formula $r \in Z^*_q$; a is a sequence number of the standard signature computing device and $0 \le a \le l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\bullet)$, $H_2(\bullet)$, and P, where P is a generator of G, and G is a group G whose order is a prime number q.

Further, $P_a$ is obtained through computation by the standard signature computing device according to a formula $P_a = x_a P$, where $x_a$ is randomly selected by the standard signature computing device from $Z^*_q$ according to a formula $x_a \in Z^*_q$, and $D_a$ is obtained through computation by the standard signature computing device according to a formula $D_a = sH(ID_a, P_a)$; where $ID_a$ is an identifier of the standard signature computing device, s is a master key, and the public parameter includes $H(\bullet)$ and q.

Further, the standard signature verification device verifies the standard signature according to a formula $VP = P_{pub}H(ID_a, P_a) + P_a H_1(m, T, P_a) + TH_2(m, T, P_a)$; the standard signature computing device is either of another signature device except an original signature device and the proxy signature device, and the original signature device; the standard signature verification device is any one of the proxy signature device, the original signature device, and the another signature device except the original signature device and the proxy signature device; and the standard signature verification device is different from the standard signature computing device.

The public parameter further includes $P_{pub}$.

Further, the acquiring unit 71 includes a determining module 711 configured to determine whether the proxy signature device administrator verifies, according to the partial proxy signature of each proxy signature device, that both of a formula $V_0 P = P_{pub}H(ID_0, P_0) + P_0 H_1(\omega, T_0, P_0) + T_0 H_2(\omega, T_0, P_0)$ and a formula $V_i P = P_{pub}H(ID_i, P_i) + P_i H_3(m, T_i, P_i) + T_i H_4(m, T_i, P_i)$ hold, and a computing module 712 configured to, if yes, compute the multi-proxy signature according to a formula $\sigma = (\omega, T_{MP}, V_{MP})$; where $V_0$ is obtained through computation by the original signature device according to a formula $V_0 = D_0 + x_0 H_1(\omega, T_0, P_0) + r_0 H_2(\omega, T_0, P_0)$, $\omega$ includes identity information of the proxy signature device and identity information of the original signature device, $T_0$ is obtained through computation by the original signature device according to a formula $T_0 = r_0 P$, and $r_0$ is randomly selected by the original signature device from $Z^*_q$ according to a formula $r_0 \in Z^*_q$. $\sigma$ is the multi-proxy signature; $T_{MP} = (T_0, T_1, \ldots, T_n)$, where $T_i$ is obtained through computation by a proxy signature device with a sequence number of i according to a formula $T_i = r_i P$, where $r_i$ is randomly selected by the proxy signature device with the sequence number of i from $Z^*_q$ according to a formula $r_i \in Z^*_q$; $V_{MP} = \Sigma_{i=0}^{n} V_i$, where $V_i$ is obtained through computation by the proxy signature device with the sequence number of i according to a formula $V_i = D_i + x_i H_3(m, T_i, P_i) + r_i H_4(m, T_i, P_i)$, i $(1 \le i \le n)$ is a sequence number of the proxy signature device, and n is a quantity of proxy signature devices; and the public parameter further includes $H_3(\bullet)$ and $H_4(\bullet)$.

Further, the verification unit 72 includes a verification module 721 configured to verify the multi-proxy signature according to a formula $V_{MP} P = P_{pub} \Sigma_{i=0}^{n} H(ID_i, P_i) + \Sigma_{i=1}^{n} P_i H_3(m, T_i, P_i) + \Sigma_{i=1}^{n} T_i H_4(m, T_i, P_i) + P_0 H_1(\omega, T_0, P_0) + T_0 H_2(\omega, T_0, P_0)$.

In this solution, a multi-proxy signature is computed according to a private key, and then the multi-proxy signature is verified according to a public key. Because computing time (which may include time for computing the public key and the private key) of the method in the present disclosure is less than time for computing bilinear pairings, compared with a multi-proxy signature based on the bilinear pairings, this solution decreases a computing amount, thereby reducing computing time. In addition, no certificate is introduced in computing the public key, ensuring that no certificate is disclosed. Computing the private key according to the public key can enable the public key and the private key to restrict each other and avoid a public key replacement attack.

The following provides some physical apparatus embodiments, and these physical apparatus embodiments are respectively corresponding to the method embodiments and the virtual apparatus embodiments that are provided above.

Figure 8:
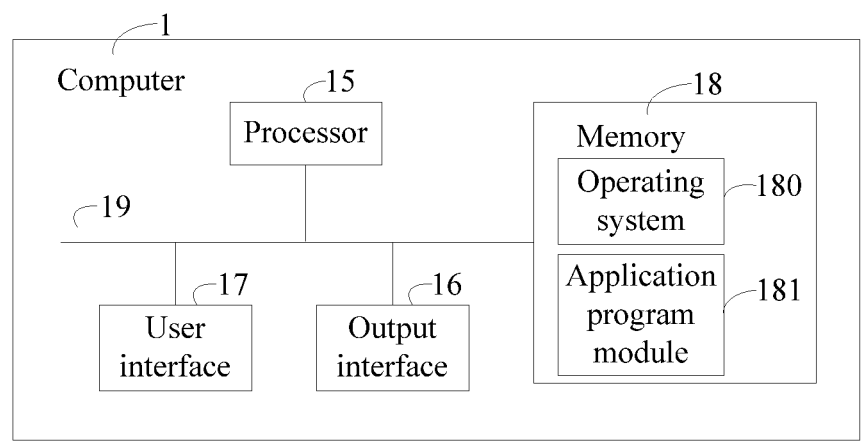
FIG. 8 is a structural schematic diagram of a physical certificateless multi-proxy signature apparatus according to an embodiment.

An embodiment provides a device, and this device may be a terminal or a network side device such as a computer, a mobile phone, a tablet computer, or a server, and is used to implement the method shown in any one of FIG. 1 to FIG. 3A and FIG. 3B. An example in which the device is a computer is used, as shown in FIG. 8, a computer 1 includes at least one processor 15, such as a central processing unit (CPU), at least one output interface 16 or another user interface 17, a memory 18, and at least one communications bus 19. The communications bus 19 is configured to implement connection and communication between these components. The computer 1 optionally includes the another user interface 17, including a display, a keyboard, or a pointing device (such as a mouse, a trackball (trackball), a touchpad, or a touch display screen). The memory 18 may include a high-speed random access memory (RAM), and may further include a non-volatile memory, for example, at least one magnetic disk storage. The memory 18 may optionally include at least one storage apparatus that is located far away from the processor 15.

In some implementation manners, the memory 18 stores the following elements: an executable module or a data structure, or a subset thereof, or an extended set thereof.

An operating system 180 includes various system programs and is configured to implement various basic services and process hardware-based tasks.

An application program module 181 includes various application programs and is configured to implement various application services.

The application program module 181 may include but is not limited to a first computing unit configured to compute a public key and a private key of a proxy signature device according to a public parameter, where the public key is corresponding to the private key, an acquiring unit configured to acquire a verification result of a standard signature, and determine, according to the verification result, whether the standard signature is valid, where the standard signature includes T and V, where T is obtained through computation by a standard signature computing device according to a formula $T = rP$, and V is obtained through computation by the standard signature computing device according to a formula $V = D_a + x_a H_1(m, T, P_a) + rH_2(m, T, P_a)$, a second computing unit configured to compute a partial proxy signature of the proxy signature device according to the private key if the verification result is used to represent that the standard signature is valid, and a sending unit configured to send the partial proxy signature to a proxy signature device administrator, so that after the proxy signature device administrator obtains a multi-proxy signature through computation according to the partial proxy signature, a multi-proxy signature verification device verifies the multi-proxy signature, where r is randomly selected from $Z^*_q$ according to a formula $r \in Z^*_q$; a is a sequence number of the standard signature computing device and $0 \le a \le l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\bullet)$, $H_2(\bullet)$, and P, where P is a generator of G, and G is a group G whose order is a prime number q.

Further, the standard signature computing device is any one of the proxy signature device, an original signature device, and another signature device except the original signature device and the proxy signature device.

The verification result is obtained after a standard signature verification device verifies the standard signature according to a formula $VP = P_{pub}H(ID_a, P_a) + P_a H_1(m,T,P_a) + TH_2(m,T,P_a)$, where the standard signature verification device is any one of the proxy signature device, the original signature device, and the another signature device except the original signature device and the proxy signature device, and the standard signature verification device is different from the standard signature computing device; where $ID_a$ is an identifier of the standard signature computing device, and the public parameter further includes $P_{pub}$.

Further, the first computing unit includes a first selecting module configured to randomly select $x_i$ from $Z^*_q$ according to a formula $x_i \in Z^*_q$, a first computing module configured to compute the public key according to a formula $P_i = x_i P$, and a second computing module configured to compute a second sub-private key according to a formula $D_i = sH(ID_i, P_i)$; where i ($1 \le i \le n$) is a sequence number of the proxy signature device, where n is a quantity of proxy signature devices; $x_i$ is a first sub-private key included in the private key of the proxy signature device; $D_i$ is the second sub-private key included in the private key of the proxy signature device; $P_i$ is the public key of the proxy signature device; $ID_i$ is an identifier of the proxy signature device; s is a master key; and the public parameter includes $H(\bullet)$ and q.

Further, the second computing unit includes an acquiring module configured to acquire an authorization signature computed by the original signature device, where the authorization signature includes $\omega$, $T_0$, and $V_0$, an authorization signature verification module configured to verify the authorization signature according to a formula $V_0 P = P_{pub} H(ID_0, P_0) + P_0 H_1(\omega, T_0, P_0) + T_0 H_2(\omega, T_0, P_0)$, a second selecting module configured to randomly select $r_i$ from $Z^*_q$ according to a formula $r_i \in Z^*_q$ if it is verified that the authorization signature is valid, a third computing module configured to compute $T_i$ according to a formula $T_i = r_i P$, and a fourth computing module configured to compute $V_i$ according to a formula $V_i = D_i + x_i H_3(m, T_i, P_i) + r_i H_4(m, T_i, P_i)$, where the partial proxy signature includes $\omega$, $T_0$, $V_0$, $T_i$, and $V_i$; where $\omega$ includes identity information of the proxy signature device and identity information of the original signature device; $T_0$ is obtained through computation by the original signature device according to a formula $T_0 = r_0 P$, where $r_0$ is randomly selected by the original signature device from $Z^*_q$ according to a formula $r_0 \in Z^*_q$; $V_0$ is obtained through computation by the original signature device according to a formula $V_0 = D_0 + x_0 H_1(\omega, T_0, P_0) + r_0 H_2(\omega, T_0, P_0)$; $x_0 (\in Z^*_q)$ is a first sub-private key of the original signature device; $D_0 (=sH(ID_0, P_0))$ is a second sub-private key of the original signature device; $ID_0$ is an identifier of the original signature device; $P_0 (=x_0 P)$ is a public key of the original signature device; m is a message m input by an input end; and the public parameter further includes $H_3(\bullet)$, $H_4(\bullet)$, and $P_{pub}$.

The application program module 181 may further include but is not limited to an acquiring unit configured to acquire a multi-proxy signature after a standard signature verification device verifies that a standard signature is valid, where the standard signature includes T and V, where T is obtained through computation by a standard signature computing device according to a formula $T = rP$, and V is obtained through computation by the standard signature computing device according to a formula $V = D_a + x_a H_1(m,T,P_a) + rH_2(m,T,P_a)$; the multi-proxy signature is obtained through computation by a proxy signature device administrator according to a partial proxy signature of each proxy signature device; and the partial proxy signature is obtained through computation by the proxy signature device according to a private key of the proxy signature device, and a verification unit configured to verify the multi-proxy signature according to a public key of each proxy signature device; where r is randomly selected from $Z^*_q$ according to a formula $r \in Z^*_q$; a is a sequence number of the standard signature computing device and $0 \le a \le l$, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\bullet)$, $H_2(\bullet)$, and P, where P is a generator of G, and G is a group G whose order is a prime number q.

Further, $P_a$ is obtained through computation by the standard signature computing device according to a formula $P_a = x_a P$, where $x_a$ is randomly selected by the standard signature computing device from $Z^*_q$ according to a formula $x_a \in Z^*_q$, and $D_a$ is obtained through computation by the standard signature computing device according to a formula $D_a = sH(ID_a, P_a)$; where $ID_a$ is an identifier of the standard signature computing device, s is a master key, and the public parameter includes $H(\bullet)$ and q.

Further, the standard signature verification device verifies the standard signature according to a formula $VP = P_{pub} H(ID_a, P_a) + P_a H_1(m,T,P_a) + TH_2(m,T,P_a)$; the standard signature computing device is either of another signature device except an original signature device and the proxy signature device, and the original signature device; the standard signature verification device is any one of the proxy signature device, the original signature device, and the another signature device except the original signature device and the proxy signature device; and the standard signature verification device is different from the standard signature computing device.

The public parameter further includes $P_{pub}$.

Further, the acquiring unit includes a determining module configured to determine whether the proxy signature device administrator verifies, according to the partial proxy signature of each proxy signature device, that both of a formula $V_0 P = P_{pub} H(ID_0, P_0) + P_0 H_1(\omega, T_0, P_0) + T_0 H_2(\omega, T_0, P_0)$ and a formula $V_i P = P_{pub} H(ID_i, P_i) + P_i H_3(m, T_i, P_i) + T_i H_4(m, T_i, P_i)$ hold, and a computing module configured to, if yes, compute the multi-proxy signature according to a formula $\sigma = (\omega, T_{MP},$ $V_{MP}$); where $V_0$ is obtained through computation by the original signature device according to a formula $V_0=D_0+x_0H_1(\omega,T_0,P_0)+r_0H_2(\omega,T_0,P_0)$, $\omega$ includes identity information of the proxy signature device and identity information of the original signature device, $T_0$ is obtained through computation by the original signature device according to a formula $T_0=r_0P$, and $r_0$ is randomly selected by the original signature device from $Z^*_q$ according to a formula $r_0\epsilon Z^*_q$; $\sigma$ is the multi-proxy signature; $T_{MP}=(T_0, T_1, \ldots, T_n)$ where $T_i$ is obtained through computation by a proxy signature device with a sequence number of i according to a formula $T_i=r_iP$, where $r_i$ is randomly selected by the proxy signature device with the sequence number of i from $Z^*_q$ according to a formula $r_i\epsilon Z^*_q$; $V_{MP}=\Sigma_{i=0}{}^n V_i$, where $V_i$ is obtained through computation by the proxy signature device with the sequence number of i according to a formula $V_i=D_i+x_iH_3(m,T_i,P_i)+r_iH_4(m,T_i,P_i)$, i (1≤i≤n) is a sequence number of the proxy signature device, and n is a quantity of proxy signature devices; and the public parameter further includes $H_3(\bullet)$ and $H_4(\bullet)$.

Further, the verification unit includes a verification module configured to verify the multi-proxy signature according to a formula $V_{MP}P=P_{pub}\Sigma_{i=0}{}^n H(ID_i,P_i)+\Sigma_{i=1}{}^n P_iH_3(m,T_i,P_i)+\Sigma_{i=1}{}^n T_iH_4(m,T_i,P_i)+P_0H_1(\omega,T_0,P_0)+T_0H_2(\omega,T_0,P_0)$.

In this embodiment of the present disclosure, by invoking programs or instructions stored in the memory 18, the processor 15 is configured to compute a public key and a private key of a proxy signature device according to a public parameter, where the public key is corresponding to the private key, acquire a verification result of a standard signature, and determine, according to the verification result, whether the standard signature is valid, where the standard signature includes T and V, where T is obtained through computation by a standard signature computing device according to a formula T=rP, and V is obtained through computation by the standard signature computing device according to a formula $V=D_a+x_aH_1(m,T,P_a)+rH_2(m,T,P_a)$, compute a partial proxy signature of the proxy signature device according to the private key if the verification result is used to represent that the standard signature is valid, and send the partial proxy signature to a proxy signature device administrator, so that after the proxy signature device administrator obtains a multi-proxy signature through computation according to the partial proxy signature, a multi-proxy signature verification device verifies the multi-proxy signature, where r is randomly selected from $Z^*_q$ according to a formula $r\epsilon Z^*_q$; a is a sequence number of the standard signature computing device and 0≤a≤l, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\bullet)$, $H_2(\bullet)$, and P, where P is a generator of G, and G is a group G whose order is a prime number q.

Further, the standard signature computing device is any one of the proxy signature device, an original signature device, and another signature device except the original signature device and the proxy signature device.

The verification result is obtained after a standard signature verification device verifies the standard signature according to a formula $VP=P_{pub}H(ID_a,P_a)+P_aH_1(m,T,P_a)+TH_2(m,T,P_a)$, where the standard signature verification device is any one of the proxy signature device, the original signature device, and the another signature device except the original signature device and the proxy signature device, and the standard signature verification device is different from the standard signature computing device; where $ID_a$ is an identifier of the standard signature computing device, and the public parameter further includes $P_{pub}$.

Further, the processor 15 is configured to: randomly select $x_i$ from $Z^*_q$ according to a formula $x_i\epsilon Z^*_q$, compute the public key according to a formula $P_i=x_iP$, and compute a second sub-private key according to a formula $D_i=sH(ID_i, P_i)$; where i (1≤i≤n) is a sequence number of the proxy signature device, where n is a quantity of proxy signature devices; $x_i$ is a first sub-private key included in the private key of the proxy signature device; $D_i$ is the second sub-private key included in the private key of the proxy signature device; $P_i$ is the public key of the proxy signature device; $ID_i$ is an identifier of the proxy signature device; s is a master key; and the public parameter includes $H(\bullet)$ and q.

Further, the computing a partial proxy signature according to the private key includes acquiring an authorization signature computed by the original signature device, where the authorization signature includes $\omega$, $T_0$, and $V_0$, verifying the authorization signature according to a formula $V_0P=P_{pub}H(ID_0,P_0)+P_0H_1(\omega,T_0,P_0)+T_0H_2(\omega,T_0,P_0)$, randomly selecting $r_i$ from $Z^*_q$ according to a formula $r_i\epsilon Z^*_q$ if it is verified that the authorization signature is valid, computing $T_i$ according to a formula $T_i=r_iP$, and computing $V_i$ according to a formula $V_i=D_i+x_iH_3(m,T_i,P_i)+r_iH_4(m,T_i,P_i)$, where the partial proxy signature includes $\omega$, $T_0$, $V_0$, $T_i$, and $V_i$; where $\omega$ includes identity information of the proxy signature device and identity information of the original signature device; $T_0$ is obtained through computation by the original signature device according to a formula $T_0=r_0P$, where $r_0$ is randomly selected by the original signature device from $Z^*_q$ according to a formula $r_0\epsilon Z^*_q$; $V_0$ is obtained through computation by the original signature device according to a formula $V_0=D_0+x_0H_1(\omega,T_0,P_0)+r_0H_2(\omega,T_0,P_0)$; $x_0(\epsilon Z^*_q)$ is a first sub-private key of the original signature device; $D_0(=sH(ID_0,P_0))$ is a second sub-private key of the original signature device; $ID_0$ is an identifier of the original signature device; is $P_0(=x_0P)$ is a public key of the original signature device; m is a message m input by an input end; and the public parameter further includes $H_3(\bullet)$, $H_4(\bullet)$, and $P_{pub}$.

In this embodiment of the present disclosure, by invoking programs or instructions stored in the memory 18, the processor 15 may be further configured to acquire a multi-proxy signature after a standard signature verification device verifies that a standard signature is valid, where the standard signature includes T and V, where T is obtained through computation by a standard signature computing device according to a formula T=rP, and V is obtained through computation by the standard signature computing device according to a formula $V=D_a+x_aH_1(m,T,P_a)+rH_2(m,T,P_a)$; the multi-proxy signature is obtained through computation by a proxy signature device administrator according to a partial proxy signature of each proxy signature device; and the partial proxy signature is obtained through computation by the proxy signature device according to a private key of the proxy signature device, and verify the multi-proxy signature according to a public key of each proxy signature device; where r is randomly selected from $Z^*_q$ according to a formula $r\epsilon Z^*_q$; a is a sequence number of the standard signature computing device and 0≤a≤l, where l is a quantity of standard signature computing devices plus one; $x_a$ is a first sub-private key included in a private key of the standard signature computing device; $D_a$ is a second sub-private key included in the private key of the standard signature computing device; m is a message m input by a transmit end; $P_a$ is a public key of the standard signature computing device; and the public parameter includes $H_1(\bullet)$, $H_2(\bullet)$, and P, where P is a generator of G, and G is a group G whose order is a prime number q.

Further, $P_a$ is obtained through computation by the standard signature computing device according to a formula $P_a=x_aP$, where $x_a$ is randomly selected by the standard signature computing device from $Z^*_q$ according to a formula $x_a \in Z^*_q$, and $D_a$ is obtained through computation by the standard signature computing device according to a formula $D_a=sH(ID_a,P_a)$; where $ID_a$ is an identifier of the standard signature computing device, s is a master key, and the public parameter includes $H(\bullet)$ and q.

Further, the standard signature verification device verifies the standard signature according to a formula $VP=P_{pub}H(ID_a,P_a)+P_aH_1(m,T,P_a)+TH_2(m,T,P_a)$; the standard signature computing device is either of another signature device except an original signature device and the proxy signature device, and the original signature device; the standard signature verification device is any one of the proxy signature device, the original signature device, and the another signature device except the original signature device and the proxy signature device; and the standard signature verification device is different from the standard signature computing device.

The public parameter further includes $P_{pub}$.

Further, the processor 15 is configured to determine whether the proxy signature device administrator verifies, according to the partial proxy signature of each proxy signature device, that both of a formula $V_0P=H(ID_0,P_0)+P_0H_1(\omega,T_0,P_0)+T_0H_2(\omega,T_0,P_0)$ and a formula $V_iP=P_{pub}H(ID_i,P_i)+P_iH_3(m,T_i,P_i)+T_iH_4(m,T_i,P_i)$ hold, and if yes, compute the multi-proxy signature according to a formula $\sigma=(\omega, T_{MP}, V_{MP})$; where $V_0$ is obtained through computation by the original signature device according to a formula $V_0=D_0+x_0H_1(\omega,T_0,P_0)+r_0H_2(\omega,T_0,P_0)$; $\omega$ includes identity information of the proxy signature device and identity information of the original signature device, $T_0$ is obtained through computation by the original signature device according to a formula $T_0=r_0P$, and $r_0$ is randomly selected by the original signature device from $Z^*_q$ according to a formula $r_0 \in Z^*_q$; $\sigma$ is the multi-proxy signature; $T_{MP}=(T_0,T_1, \ldots, T_n)$, where $T_i$ is obtained through computation by a proxy signature device with a sequence number of i according to a formula $T_i=r_iP$, where $r_i$ is randomly selected by the proxy signature device with the sequence number of i from $Z^*_q$ according to a formula $r_i \in Z^*_q$; $V_{MP}=\Sigma_{i=0}^n V_i$, where $V_i$ is obtained through computation by the proxy signature device with the sequence number of i according to a formula $V_i=D_i+x_iH_3(m,T_i,P_i)+r_iH_4(m,T_i,P_i)$, i ($1 \le i \le n$) is a sequence number of the proxy signature device, and n is a quantity of proxy signature devices; and the public parameter further includes $H_3(\bullet)$ and $H_4(\bullet)$.

Further, the processor 15 is configured to verify the multi-proxy signature according to a formula $V_{MP}P=P_{pub}\Sigma_{i=0}^n H(ID_i,P_i)+\Sigma_{i=1}^n P_iH_3(m,T_i,P_i)+\Sigma_{i=1}^n T_iH_4(m,T_i,P_i)+P_0H_1(\omega,T_0,P_0)+T_0H_2(\omega,T_0,P_0)$.

In this solution, a multi-proxy signature is computed according to a private key, and then the multi-proxy signature is verified according to a public key. Because computing time (which may include time for computing the public key and the private key) of the method in the present disclosure is less than time for computing bilinear pairings, compared with a multi-proxy signature based on the bilinear pairings, this solution decreases a computing amount, thereby reducing computing time. In addition, no certificate is introduced in computing the public key, ensuring that no certificate is disclosed. Computing the private key according to the public key can enable the public key and the private key to restrict each other and avoid a public key replacement attack.

Based on the foregoing descriptions of the implementation manners, a person skilled in the art may clearly understand that the present disclosure may be implemented by software in addition to necessary universal hardware or by hardware only. In most circumstances, the former is a preferred implementation manner. Based on such an understanding, the technical solutions of the present disclosure essentially or the part contributing to the may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A certificateless multi-proxy signature method, comprising:
   computing, by a proxy signature device, a public key and a private key of the proxy signature device according to a public parameter, wherein the public key is corresponding to the private key;
   acquiring a verification result of a standard signature;
   determining, according to the verification result, whether the standard signature is valid, wherein the standard signature comprises T and V, wherein T is obtained through computation by a standard signature computing device according to a formula T=rP, and wherein V is obtained through computation by the standard signature computing device according to a formula $V=D_a+x_aH_1(m,T,P_a)+rH_2(m,T,P_a)$;
   computing a partial proxy signature of the proxy signature device according to the private key when the verification result is used to represent that the standard signature is valid; and
   sending the partial proxy signature to a proxy signature device administrator, so that after the proxy signature device administrator obtains a multi-proxy signature through computation according to the partial proxy signature, a multi-proxy signature verification device verifies the multi-proxy signature, wherein r is randomly selected from $Z^*_q$ according to a formula $r \in Z^*_q$, wherein a is a sequence number of the standard signature computing device and $0 \le a \le l$, wherein l is a quantity of standard signature computing devices plus one, wherein $x_a$ is a first sub-private key comprised in a private key of the standard signature computing device, wherein $D_a$ is a second sub-private key comprised in the private key of the standard signature computing device, wherein m is a message m input by a transmit end, wherein $P_a$ is a public key of the standard signature computing device, wherein the public parameter comprises $H_1(\bullet)$, $H_2(\bullet)$, and P, wherein P is a generator of G, and wherein G is a group G whose order is a prime number q.

2. The certificateless multi-proxy signature method according to claim 1, wherein the standard signature computing device is any one of:
the proxy signature device;
an original signature device; and
another signature device except the original signature device and the proxy signature device, wherein the verification result is obtained after a standard signature verification device verifies the standard signature according to a formula $VP=P_{pub}H(ID_a,P_a)+P_aH_1(m,T,P_a)+TH_2(m,T,P_a)$, wherein the standard signature verification device is any one of:
the proxy signature device;
the original signature device; and
the another signature device except the original signature device and the proxy signature device, and wherein the standard signature verification device is different from the standard signature computing device, wherein $ID_a$ is an identifier of the standard signature computing device, and wherein the public parameter further comprises $P_{pub}$.

3. The certificateless multi-proxy signature method according to claim 1, wherein computing, by the proxy signature device, the public key and the private key of the proxy signature device according to the public parameter comprises:
selecting $x_i$ from $Z^*_q$ randomly according to a formula $x_i \in Z^*_q$;
computing the public key according to a formula $P_i=x_iP$; and
computing a second sub-private key according to a formula $D_i=sH(ID_i,P_i)$, wherein i ($1 \le i \le n$) is a sequence number of the proxy signature device, wherein n is a quantity of proxy signature devices, wherein $x_i$ is a first sub-private key comprised in the private key of the proxy signature device, wherein $D_i$ is the second sub-private key comprised in the private key of the proxy signature device, wherein $P_i$ is the public key of the proxy signature device, wherein $ID_i$ is an identifier of the proxy signature device, wherein s is a master key, and wherein the public parameter comprises H(•) and q.

4. The certificateless multi-proxy signature method according to claim 3, wherein computing the partial proxy signature of the proxy signature device according to the private key comprises:
acquiring an authorization signature computed by the original signature device, wherein the authorization signature comprises $\omega$, $T_0$, and $V_0$;
verifying the authorization signature according to a formula $V_0P=P_{pub}H(ID_0,P_0)+P_0H_1(\omega,T_0,P_0)+T_0H_2(\omega,T_0,P_0)$;
selecting $r_i$ from $Z^*_q$ randomly according to a formula $r_i \in Z^*_q$ when it is verified that the authorization signature is valid;
computing $T_i$ according to a formula $T_i=r_iP$; and
computing $V_i$ according to a formula $V_i=D_i+x_iH_3(m,T_i,P_i)+r_iH_4(m,T_i,P_i)$, wherein the partial proxy signature comprises $\omega$, $T_0$, $V_0$, $T_i$, and $V_i$, wherein $\omega$ comprises identity information of the proxy signature device and identity information of the original signature device, wherein $T_0$ is obtained through computation by the original signature device according to a formula $T_0=r_0P$, wherein $r_0$ is randomly selected by the original signature device from $Z^*_q$ according to a formula $r_0 \in Z^*_q$, wherein $V_0$ is obtained through computation by the original signature device according to a formula $V_0=D_0+x_0H_1(\omega,T_0,P_0)+r_0H_2(\omega,T_0,P_0)$, wherein $x_0 (\in Z^*_q)$ is a first sub-private key of the original signature device, wherein $D_0 (=sH(ID_0,P_0))$ is a second sub-private key of the original signature device, wherein $ID_0$ is an identifier of the original signature device, wherein $P_0 (=x_0P)$ is a public key of the original signature device, wherein m is a message m input by an input end, and wherein the public parameter further comprises $H_3(•)$, $H_4(•)$, and $P_{pub}$.

5. A certificateless multi-proxy signature method, comprising:
acquiring, by a multi-proxy signature verification device, a multi-proxy signature after a standard signature verification device verifies that a standard signature is valid, wherein the standard signature comprises T and V, wherein T is obtained through computation by a standard signature computing device according to a formula T=rP, wherein V is obtained through computation by the standard signature computing device according to a formula $V=D_a+x_aH_1(m,T,P_a)+rH_2(m,T,P_a)$, wherein the multi-proxy signature is obtained through computation by a proxy signature device administrator according to a partial proxy signature of each proxy signature device, and wherein the partial proxy signature is obtained through computation by the each proxy signature device according to a private key of the proxy signature device; and
verifying the multi-proxy signature according to a public key of each proxy signature device, wherein r is randomly selected from $Z^*_q$ according to a formula $r \in Z^*_q$, wherein a is a sequence number of the standard signature computing device, wherein $0 \le a \le l$, wherein l is a quantity of standard signature computing devices plus one, wherein $x_a$ is a first sub-private key comprised in a private key of the standard signature computing device, wherein $D_a$ is a second sub-private key comprised in the private key of the standard signature computing device, wherein m is a message m input by a transmit end, wherein $P_a$ is a public key of the standard signature computing device, wherein the public parameter comprises $H_1(•)$, $H_2(•)$, and P, wherein P is a generator of G, and wherein G is a group G whose order is a prime number q.

6. The certificateless multi-proxy signature method according to claim 5, wherein $P_a$ is obtained through computation by the standard signature computing device according to a formula $P_a=x_aP$, wherein $x_a$ is randomly selected by the standard signature computing device from $Z^*_q$ according to a formula $x_a \in Z^*_q$, wherein $D_a$ is obtained through computation by the standard signature computing device according to a formula $D_a=sH(ID_a,P_a)$, wherein $ID_a$ is an identifier of the standard signature computing device, wherein s is a master key, and wherein the public parameter comprises H(•) and q.

7. The certificateless multi-proxy signature method according to claim 6, wherein the standard signature verification device verifies the standard signature according to a formula $VP=P_{pub}H(ID_a,P_a)+P_aH_1(m,T,P_a)+TH_2(m,T,P_a)$, wherein the standard signature computing device is one of another signature device except an original signature device and the proxy signature device, and the original signature device, wherein the standard signature verification device is any one of:
the proxy signature device;
the original signature device; and
the another signature device except the original signature device and the proxy signature device, wherein the standard signature verification device is different from the standard signature computing device, and wherein the public parameter further comprises $P_{pub}$.

8. The certificateless multi-proxy signature method according to claim 7, wherein acquiring the multi-proxy signature comprises:
determining whether the proxy signature device administrator verifies, according to the partial proxy signature of each proxy signature device, that both a formula $V_0P=P_{pub}H(ID_0,P_0)+P_0H_1(\omega,T_0,P_0)+T_0H_2(\omega,T_0,P_0)$ and a formula $V_iP=P_{pub}H(ID_i,P_i)+P_iH_3(m,T_i,P_i)+T_iH_4(m,T_i,P_i)$ hold; and
computing the multi-proxy signature according to a formula $\sigma=(\omega,T_{MP},V_{MP})$ when the proxy signature device administrator verifies that both the formula $V_0P=P_{pub}H(ID_0,P_0)+P_0H_1(\omega,T_0,P_0)+T_0H_2(\omega,T_0,P_0)$ and the formula $V_iP=P_{pub}H(ID_i,P_i)+P_iH_3(m,T_i,P_i)+T_iH_4(m,T_i,P_i)$ hold, wherein $V_0$ is obtained through computation by the original signature device according to a formula $V_0=D_0+x_0H_1(\omega,T_0,P_0)+r_0H_2(\omega,T_0,P_0)$, wherein $\omega$ comprises identity information of the proxy signature device and identity information of the original signature device, wherein $T_0$ is obtained through computation by the original signature device according to a formula $T_0=r_0P$, wherein $r_0$ is randomly selected by the original signature device from $Z^*_q$ according to a formula $r_0 \in Z^*_q$, wherein $\sigma$ is the multi-proxy signature, wherein $T_{MP}=(T_0, T_1, \ldots, T_n)$, wherein $T_i$ is obtained through computation by a proxy signature device with a sequence number of i according to a formula $T_i=r_iP$, wherein $r_i$ is randomly selected by the proxy signature device with the sequence number of i from $Z^*_q$ according to a formula $r_i \in Z^*_q$, wherein $V_{MP}=\Sigma_{i=0}^n V_i$, wherein $V_i$ is obtained through computation by the proxy signature device with the sequence number of i according to a formula $V_i=D_i+x_iH_3(m,T_i,P_i)+r_iH_4(m,T_i,P_i)$, wherein i ($1 \leq i \leq n$) is a sequence number of the proxy signature device, wherein n is a quantity of proxy signature devices, and wherein the public parameter further comprises $H_3(\cdot)$ and $H_4(\cdot)$.

9. The certificateless multi-proxy signature method according to claim 8, wherein verifying the multi-proxy signature according to the public key of each proxy signature device comprises verifying the multi-proxy signature according to a formula $V_{MP}P=P_{pub}\Sigma_{i=0}^n H(ID_i,P_i)+\Sigma_{i=1}^n P_iH_3(m,T_i,P_i)=\Sigma_{i=1}^n T_iH_4(m,T_i,P_i)+P_0H_1(\omega,T_0,P_0)+T_0H_2(\omega,T_0,P_0)$.

10. A certificateless multi-proxy signature apparatus, comprising a memory storing instructions, the instructions being executable by a processor to:
acquire a multi-proxy signature after a standard signature verification device verifies that a standard signature is valid, wherein the standard signature comprises T and V, wherein T is obtained through computation by a standard signature computing device according to a formula $T=rP$, wherein V is obtained through computation by the standard signature computing device according to a formula $V=D_a+x_aH_1(m,T,P_a)+rH_2(m,T,P_a)$, wherein the multi-proxy signature is obtained through computation by a proxy signature device administrator according to a partial proxy signature of each proxy signature device, and wherein the partial proxy signature is obtained through computation by the proxy signature device according to a private key of the proxy signature device; and
verify the multi-proxy signature according to a public key of each proxy signature device, wherein r is randomly selected from $Z^*_q$ according to a formula $r \in Z^*_q$, wherein a is a sequence number of the standard signature computing device, wherein $0 \leq a \leq 1$, wherein 1 is a quantity of standard signature computing devices plus one, wherein $x_a$ is a first sub-private key comprised in a private key of the standard signature computing device, wherein $D_a$ is a second sub-private key comprised in the private key of the standard signature computing device, wherein m is a message m input by a transmit end, wherein $P_a$ is a public key of the standard signature computing device, wherein the public parameter comprises $H_1(\cdot)$, $H_2(\cdot)$, and P, wherein P is a generator of G, and wherein G is a group G whose order is a prime number q.

11. The certificateless multi-proxy signature apparatus according to claim 10, wherein $P_a$ is obtained through computation by the standard signature computing device according to a formula $P_a=x_aP$, wherein $x_a$ is randomly selected by the standard signature computing device from $Z^*_q$ according to a formula $x_a \in Z^*_q$, wherein $D_a$ is obtained through computation by the standard signature computing device according to a formula $D_a=sH(ID_a,P_a)$, wherein $ID_a$ is an identifier of the standard signature computing device, wherein s is a master key, and wherein the public parameter comprises $H(\cdot)$ and q.

12. The certificateless multi-proxy signature apparatus according to claim 11, wherein the standard signature verification device verifies the standard signature according to a formula $VP=P_{pub}H(ID_a,P_a)+P_aH_1(m,T,P_a)+TH_2(m,T,P_a)$, wherein the standard signature computing device is one of another signature device except an original signature device and the proxy signature device, and the original signature device, wherein the standard signature verification device is any one of:
the proxy signature device;
the original signature device; and
the another signature device except the original signature device and the proxy signature device, wherein the standard signature verification device is different from the standard signature computing device, and wherein the public parameter further comprises $P_{pub}$.

13. The certificateless multi-proxy signature apparatus according to claim 12, wherein acquiring the multi-proxy signature after the standard signature verification device verifies that the standard signature is valid comprises:
determining whether the proxy signature device administrator verifies, according to the partial proxy signature of each proxy signature device, that both a formula $V_0P=P_{pub}H(ID_0,P_0)+P_0H_1(\omega,T_0,P_0)+T_0H_2(\omega,T_0,P_0)$ and a formula $V_iP=P_{pub}H(ID_i,P_i)+P_iH_3(m,T_i,P_i)+T_iH_4(m,T_i,P_i)$ hold; and
computing the multi-proxy signature according to a formula $\sigma=(\omega,T_{MP},V_{MP})$ when the proxy signature device administrator verifies that both the formula $V_0P=P_{pub}H(ID_0,P_0)+P_0H_1(\omega,T_0,P_0)+T_0H_2(\omega,T_0,P_0)$ and the formula $V_iP=P_{pub}H(ID_i,P_i)+P_iH_3(m,T_i,P_i)+T_iH_4(m,T_i,P_i)$ hold, wherein $V_0$ is obtained through computation by the original signature device according to a formula $V_0=D_0+x_0H_1(\omega,T_0,P_0)+r_0H_2(\omega,T_0, P_0)$, wherein $\omega$ comprises identity information of the proxy signature device and identity information of the original signature device, wherein $T_0$ is obtained through computation by the original signature device according to a formula $T_0=r_0P$, wherein $r_0$ is randomly selected by the original signature device from $Z^*_q$ according to a formula $r_0 \in Z^*_q$, wherein $\sigma$ is the multi-proxy signature, wherein $T_{MP}$ is given by $T_{MP}=(T_0, T_1, \ldots, T_n)$, wherein $T_i$ is obtained through computation by a proxy signature device with a sequence number of i according to a formula $T_i=r_iP$, wherein $r_i$ is randomly selected by the proxy signature device with the sequence number of i from $Z^*_q$ according to a formula $r_i \in Z^*_q$, wherein $V_{MP}$ is given by $V_{MP}=\Sigma_{i=0}^n V_i$, wherein $V_i$ is obtained through computation by the proxy signature device with the sequence number of i according to a formula $V_i=D_i+x_iH_3(m,T_i,P_i)+r_iH_4(m,T_i,P_i)$, wherein i ($1 \leq i \leq n$) is a sequence number of the proxy signature device, wherein n is a quantity of proxy signature devices, and wherein the public parameter further comprises $H_3(\bullet)$ and $H_4(\bullet)$.

14. The certificateless multi-proxy signature apparatus according to claim 13, wherein verifying the multi-proxy signature according to the public key of each proxy signature device comprises verifying the multi-proxy signature according to a formula $V_{MP}P=P_{pub}\Sigma_{i=0}^n H(ID_i,P_i)+\Sigma_{i=1}^n P_iH_3(m,T_i,P_i)+\Sigma_{i=1}^n T_iH_4(m,T_i,P_i)+P_0H_1(\omega,T_0,P_0)+T_0H_2(\omega,T_0,P_0)$.

* * * * *

UNITED STATES PATENT AND TRADEMARK OFFICE
CERTIFICATE OF CORRECTION

| | | |
|---|---|---|
| PATENT NO. | : 9,641,340 B2 | Page 1 of 1 |
| APPLICATION NO. | : 14/830978 | |
| DATED | : May 2, 2017 | |
| INVENTOR(S) | : Chang Wang et al. | |

It is certified that error appears in the above-identified patent and that said Letters Patent is hereby corrected as shown below:

On the Title Page

Item (73) Assignee should read:
Huawei Device Co., Ltd., Shenzhen, China

Signed and Sealed this
Fourth Day of July, 2017

Joseph Matal
*Performing the Functions and Duties of the*
*Under Secretary of Commerce for Intellectual Property and*
*Director of the United States Patent and Trademark Office*